United States Patent
Zhang et al.

(10) Patent No.: US 12,166,984 B2
(45) Date of Patent: Dec. 10, 2024

(54) APPLICABILITY OF IMPLICIT TRANSFORM SELECTION

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

(*) Notice: Subject to any disclaimer, the term of this patent is extended or adjusted under 35 U.S.C. 154(b) by 248 days.

(21) Appl. No.: 17/541,013

(22) Filed: Dec. 2, 2021

(65) Prior Publication Data

US 2022/0094929 A1 Mar. 24, 2022

Related U.S. Application Data

(63) Continuation of application No. PCT/CN2020/094907, filed on Jun. 8, 2020.

(30) Foreign Application Priority Data

Jun. 6, 2019 (WO) ............... PCT/CN2019/090261
Jun. 15, 2019 (WO) ............... PCT/CN2019/091435

(51) Int. Cl.
*H04N 19/12* (2014.01)
*H04N 19/159* (2014.01)
(Continued)

(52) U.S. Cl.
CPC ........... *H04N 19/12* (2014.11); *H04N 19/159* (2014.11); *H04N 19/176* (2014.11); *H04N 19/61* (2014.11); *H04N 19/625* (2014.11)

(58) Field of Classification Search
None
See application file for complete search history.

(56) References Cited

U.S. PATENT DOCUMENTS 8,274,514 B1 9/2012 Martino
8,340,193 B2 12/2012 Lu et al.
(Continued)

FOREIGN PATENT DOCUMENTS

CN 103098473 A 5/2013
CN 105556963 A 5/2016
(Continued)

OTHER PUBLICATIONS

Abdoli et al."CE8: BDPCM with Horizontal/Vertical Predictor and Independently Decodable Areas (Test 8.3.1b)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0057, 2019.
(Continued)

*Primary Examiner* — Talha M Nawaz
(74) *Attorney, Agent, or Firm* — Conley Rose, P.C.

(57) ABSTRACT

Devices, systems and methods for digital video coding, which includes using multiple transforms, are described. In a representative aspect, a method for video processing includes making a decision, for a current block of a video, regarding an application of a transform to the current block based on an indication in a bitstream representation of the video at a coding unit (CU) level, a coding block (CB) level, or a transform unit (TU) level, and performing, based on the decision, a conversion between the current block and the bitstream representation.

19 Claims, 17 Drawing Sheets

(51) Int. Cl.
  *H04N 19/176* (2014.01)
  *H04N 19/61* (2014.01)
  *H04N 19/625* (2014.01)

(56) References Cited

U.S. PATENT DOCUMENTS

| | | | |
|---|---|---|---|
| 9,661,338 | B2 | 5/2017 | Karczewicz et al. |
| 9,883,184 | B2 | 1/2018 | Rapaka et al. |
| 10,057,578 | B2 | 8/2018 | Rapaka et al. |
| 10,200,719 | B2 * | 2/2019 | Zhang ............... G06F 17/147 |
| 10,382,768 | B2 | 8/2019 | Huang et al. |
| 10,405,000 | B2 | 9/2019 | Kao et al. |
| 10,419,763 | B2 | 9/2019 | Huang et al. |
| 10,440,399 | B2 | 10/2019 | Karczewicz et al. |
| 10,506,254 | B2 | 12/2019 | Li et al. |
| 10,560,723 | B2 | 2/2020 | Zhang et al. |
| 10,574,993 | B2 | 2/2020 | Zhang et al. |
| 10,582,203 | B2 | 3/2020 | Huang et al. |
| 10,609,367 | B2 | 3/2020 | Zhao et al. |
| 10,609,414 | B2 | 3/2020 | Zhang et al. |
| 10,652,576 | B2 | 5/2020 | Li et al. |
| 10,666,937 | B2 | 5/2020 | Zhao et al. |
| 11,647,214 | B2 | 5/2023 | Said et al. |
| 2009/0074053 | A1 | 3/2009 | Narasimhan et al. |
| 2012/0287989 | A1 | 11/2012 | Budagavi et al. |
| 2013/0266233 | A1 | 10/2013 | Kondo |
| 2013/0308708 | A1 | 11/2013 | Sugio et al. |
| 2013/0343464 | A1 | 12/2013 | Van Der Auwera et al. |
| 2014/0044179 | A1 | 2/2014 | Li et al. |
| 2014/0056347 | A1 | 2/2014 | Xu et al. |
| 2014/0126650 | A1 | 5/2014 | Lim |
| 2014/0226721 | A1 | 8/2014 | Joshi et al. |
| 2014/0286413 | A1 | 9/2014 | Joshi et al. |
| 2014/0355616 | A1 | 12/2014 | Coban et al. |
| 2015/0003518 | A1 | 1/2015 | Nguyen et al. |
| 2015/0117520 | A1 | 4/2015 | Zhou |
| 2016/0100175 | A1 * | 4/2016 | Laroche ............... H04N 19/192 375/240.18 |
| 2016/0219290 | A1 * | 7/2016 | Zhao ............... H04N 19/167 |
| 2016/0353112 | A1 | 12/2016 | Zhang et al. |
| 2017/0188029 | A1 | 6/2017 | An et al. |
| 2018/0020218 | A1 * | 1/2018 | Zhao ............... H04N 19/124 |
| 2018/0077417 | A1 | 3/2018 | Huang |
| 2018/0091817 | A1 | 3/2018 | Sole et al. |
| 2018/0098081 | A1 | 4/2018 | Zhao et al. |
| 2018/0176582 | A1 | 6/2018 | Zhao et al. |
| 2018/0205949 | A1 | 7/2018 | Hsiang et al. |
| 2018/0332289 | A1 | 11/2018 | Huang |
| 2019/0104323 | A1 | 4/2019 | Baylon et al. |
| 2020/0092555 | A1 * | 3/2020 | Zhao ............... H04N 19/12 |
| 2020/0099924 | A1 * | 3/2020 | Seregin ............... H04N 19/134 |
| 2020/0221075 | A1 * | 7/2020 | Philippe ............... H04N 19/593 |
| 2020/0228834 | A1 | 7/2020 | Li et al. |
| 2020/0260070 | A1 | 8/2020 | Yoo et al. |
| 2020/0288121 | A1 * | 9/2020 | Zhao ............... H04N 19/176 |
| 2020/0389671 | A1 * | 12/2020 | Zhao ............... H04N 19/80 |
| 2020/0396455 | A1 * | 12/2020 | Liu ............... H04N 19/122 |
| 2021/0014480 | A1 * | 1/2021 | George ............... H04N 19/105 |
| 2021/0014533 | A1 | 1/2021 | Tsukuba |
| 2021/0195195 | A1 | 6/2021 | Zhao et al. |
| 2021/0211727 | A1 | 7/2021 | Salehifar et al. |
| 2022/0070465 | A1 | 3/2022 | Zhu et al. |
| 2022/0086490 | A1 | 3/2022 | Koo et al. |
| 2022/0094930 | A1 | 3/2022 | Zhang et al. |
| 2022/0094987 | A1 | 3/2022 | Zhang et al. |
| 2022/0109878 | A1 | 4/2022 | Koo et al. |

FOREIGN PATENT DOCUMENTS

| | | |
|---|---|---|
| CN | 107925763 A | 4/2018 |
| CN | 108632611 A | 10/2018 |
| CN | 109089117 A | 12/2018 |
| CN | 109547801 A | 3/2019 |
| CN | 109691101 A | 4/2019 |
| IN | 109716772 A | 5/2019 |
| KR | 20190067732 A | 6/2019 |
| WO | 2012006574 A2 | 1/2012 |
| WO | 2014071439 A1 | 5/2014 |
| WO | 2015053697 A1 | 4/2015 |
| WO | 2015142556 A2 | 9/2015 |
| WO | 2016123388 A1 | 8/2016 |
| WO | 2017091776 A1 | 6/2017 |
| WO | 2017157249 A1 | 9/2017 |
| WO | 2018064517 A1 | 4/2018 |
| WO | 2018161954 A1 | 9/2018 |
| WO | 2018226067 A1 | 12/2018 |
| WO | 2018054269 A1 | 3/2019 |
| WO | 2019074291 A1 | 4/2019 |
| WO | 2019076138 A1 | 4/2019 |
| WO | 2019114713 A1 | 6/2019 |

OTHER PUBLICATIONS

Ankur et al. "DCT/DST-Based Transform Coding For Intra Prediction in Image/Video Coding," IEEE Transactions on Image Processing, Oct. 2013, 22(10):3974-3981.

Bross et al. "Non-CE8: Unified Transform Type Signalling and Residual Coding for Transform Skip," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0464, 2019.

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001 v7 and v8, 2019.

Bross et al. "Versatile Video Coding (Draft 6),"Joint Video Experts Team (JVET)of ITU-T SG 16 WP 3 and ISO/IEC JTC 1/SC 29/WG 1115th Meeting: Gothenburg, SE, Jul. 3-12, 2019, document JVET-O2001 vC and v14, 2019.

Choi et al. "CE8-related : Transform Skip Restriction," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0430, 2019.

De-Luxian-Hernandez et al. "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0102, 2019.

Gao et al. "Non-CE6: Unification of Implicit Transform Core Selection," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0172, 2019.

Karczewicz et al. "CE8-Related: Quantized Residual BDPCM," oint Video Experts Team (JVET) of ITU-T SG 16 WP 3 and ISO/IEC JTC 1/SC 29/WG 11 14th Meeting: Geneva, CH, Mar. 19-27, 2019, document JVET-N0413, 2019.

Koo et al. "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0133, 2018.

Koo et al. "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0193, 2019.

Pfaff et al. "CE3: Affine Linear Weighted Intra Prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0217, 2019.

Salehifar et al. "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0099, 2018.

Ma et al. "Non-CE6: Unified Transform Selection for implicit MTS," Joint Video Experts Team (JVET) of ITU-T SG 16 WP 3 and ISO/IEC JTC 1/SC 29/WG 11 14th Meeting: Geneva, CH, Mar. 25-29, 2019, document JVET-N0338, 2019.

(56) References Cited

OTHER PUBLICATIONS

International Search Report and Written Opinion from International Patent Application No. PCT/CN2020/094904 dated Sep. 10, 2020 (13 pages).
International Search Report and Written Opinion from International Patent Application No. PCT/CN2020/094905 dated Sep. 9, 2020 (10 pages).
International Search Report and Written Opinion from International Patent Application No. PCT/CN2020/094907 dated Sep. 9, 2020 (12 pages).
International Search Report and Written Opinion from International Patent Application No. PCT/CN2020/097021 dated Aug. 31, 2020 (13 pages).
Non Final Office Action from U.S. Appl. No. 17/540,980 dated Aug. 30, 2023.
Non Final Office Action from U.S. Appl. No. 17/457,473 dated Jan. 11, 2024.
Cao et al. "Non-CE-6: Implicit Transform Selection Based on Intra Mode." Joint Video Experts Team (JVET) of ITU-T SG 16 WP 3 and ISO/IEC JTC 1/SC 29/WG 11 14th Meeting, Geneva, CH, Mar. 1-27, 2019, document JVET-N0161, 2019.
Chiang et al., "CE6-related: Unified Implicit MTS Between ISP Mode and Regular Intra Mode," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0089, 2019.
Zhou et al. "CE6-related: A Study of Primary Transforms," Joint Video Experts Team (JVET) of ITU-T SG 16 WP 3 and ISO/IEC JTC 1/SC 29/WG 11 13th Meeting: Marrakesh, MA, Jan. 9-18, 2019, documet JVET-M0046, 2019.
First Office Action from Chinese Patent Application No. 202080041881.5 dated Apr. 28, 2024.
First Office Action from Chinese Patent Application No. 202080041875.X dated Apr. 29, 2024.
First Office Action from Chinese Patent Application No. 202080043276.1 dated May 6, 2024.
First Office Action from Chinese Patent Application No. 202080045375.3 dated Apr. 19, 2024.
Notice of Allowance from U.S. Appl. No. 17/540,980 dated Jun. 7, 2024.

\* cited by examiner

FIG. 9

APPLICABILITY OF IMPLICIT TRANSFORM SELECTION

CROSS-REFERENCE TO RELATED APPLICATIONS

This application is a continuation of International Patent Application No. PCT/CN2020/094907, filed on Jun. 8, 2020, which claims the priority to and benefits of International Patent Application No. PCT/CN2019/090261 filed on Jun. 6, 2019, and International Patent Application No. PCT/CN2019/091435 filed on Jun. 15, 2019. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, methods on multiple transforms for video coding, are described. The described methods may be applied to both the existing video coding standards (e.g., High Efficiency Video Coding (HEVC)) and future video coding standards (e.g., Versatile Video Coding (VVC)) or codecs.

In yet another representative aspect, the disclosed technology may be used to provide an example method for video processing. This method includes making a decision, based on a set of coefficients, regarding an application of a transform to a current block of a video, and performing, based on the decision, a conversion between the current block and a bitstream representation of the video.

In yet another representative aspect, the disclosed technology may be used to provide an example method for video processing. This method includes making a decision, based on coding information associated with a current block of a video, regarding an application of a transform to the current block, and performing, based on the decision, a conversion between the current block and a bitstream representation of the video.

In yet another representative aspect, the disclosed technology may be used to provide an example method for video processing. This method includes making a decision, for a current block of a video, regarding an application of a transform to the current block based on an indication in a bitstream representation of the video at a coding unit (CU) level, a coding block (CB) level, or a transform unit (TU) level, and performing, based on the decision, a conversion between the current block and the bitstream representation.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 9 shows an example of the order of processing of the rows of pixels to maximize throughput for 4×N blocks with vertical predictor.

DETAILED DESCRIPTION

1 Introduction

Figure 1:
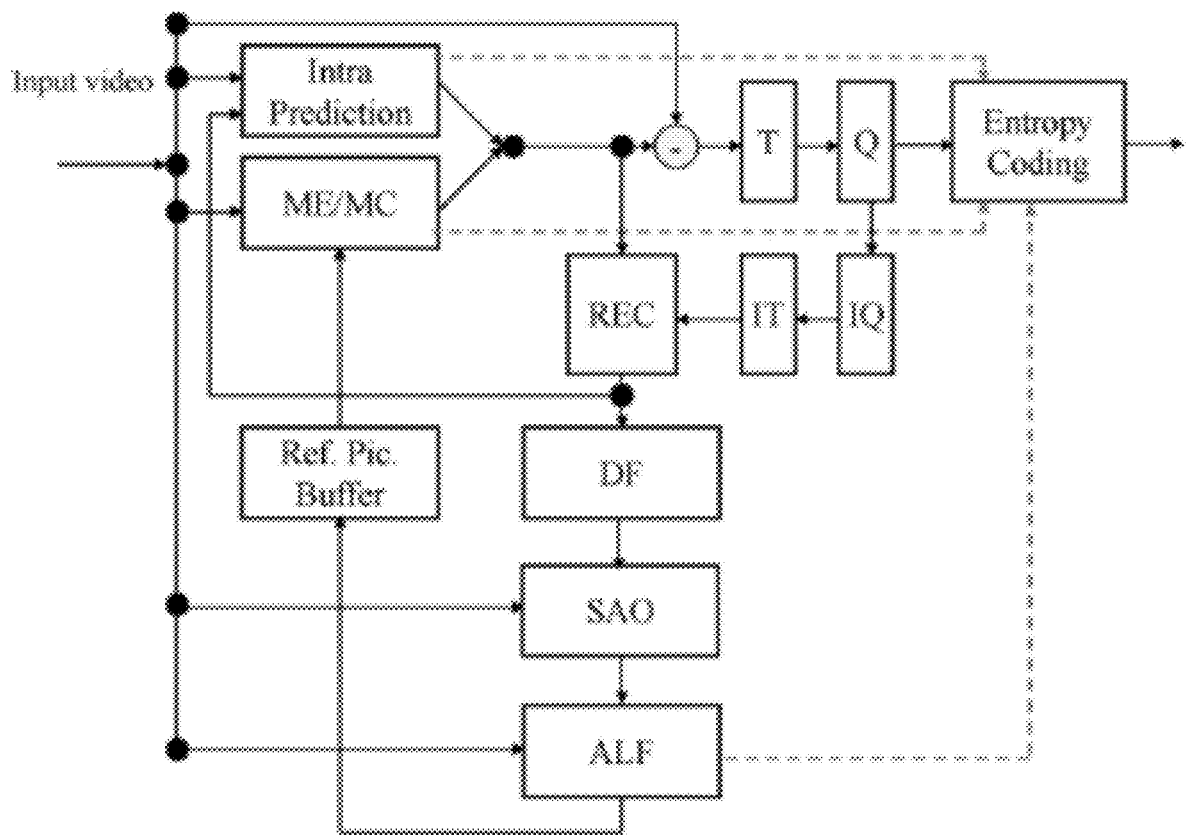
FIG. 1 shows an example of an encoder block diagram.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

2 Embodiments and Examples for Methods on Multiple Transforms 2.1 Color Space and Chroma Subsampling Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

4:4:4 Format. Each of the three Y'CbCr components have the same sample rate, thus there is no chroma subsampling. This scheme is sometimes used in high-end film scanners and cinematic post production.

4:2:2 Format. The two chroma components are sampled at half the sample rate of luma: the horizontal chroma resolution is halved. This reduces the bandwidth of an uncompressed video signal by one-third with little to no visual difference 4:2:0 Format. In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

2.2 Coding Flow of a Typical Video Codec

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.3 Intra Mode Coding with 67 Intra Prediction Modes

Figure 2:
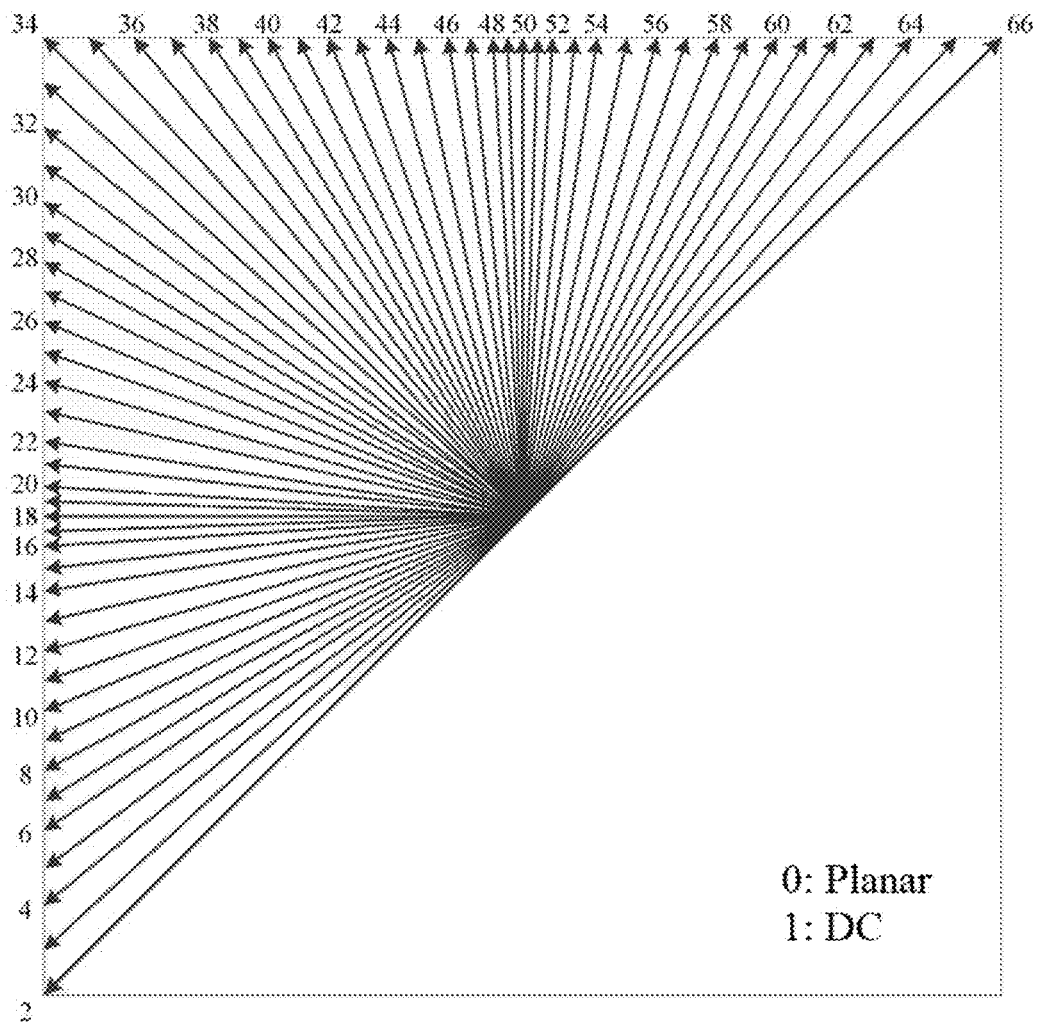
FIG. 2 shows an example of 67 intra prediction modes.

To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

Conventional angular intra prediction directions are defined from 45 degrees to −135 degrees in clockwise direction as shown in FIG. 1. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged (e.g., 67), and the intra mode coding is unchanged.

In HEVC, every intra-coded block has a square shape and the length of each of its side is a power of 2. Thus, no division operations are required to generate an intra-predictor using DC mode. In VTV2, blocks can have a rectangular shape that necessitates the use of a division operation per block in the general case. To avoid division operations for DC prediction, only the longer side is used to compute the average for non-square blocks.

2.4 Wide-Angle Intra Prediction for Non-Square Blocks

In some embodiments, conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, e.g., 67, and the intra mode coding is unchanged.

Figure 3A:
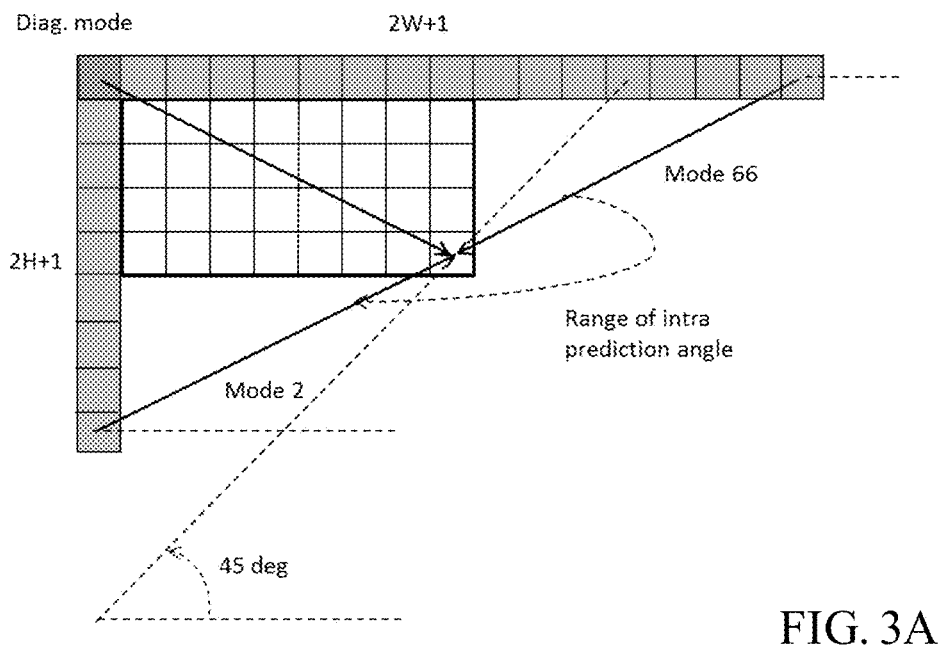
FIGS. 3A and 3B show examples of reference samples for wide-angle intra prediction modes for non-square blocks.
Figure 3B:
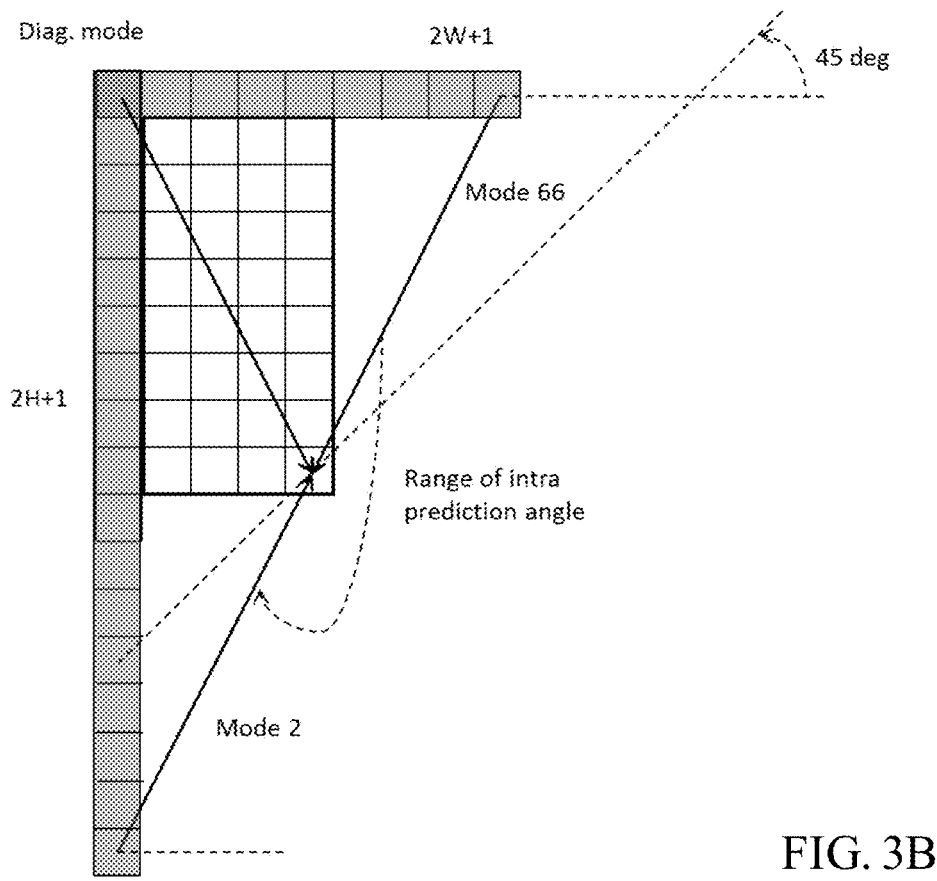

To support these prediction directions, the top reference with length 2W+1, and the left reference with length 2H+1, are defined as shown in the examples in FIGS. 3A and 3B.

In some embodiments, the mode number of replaced mode in wide-angular direction mode is dependent on the aspect ratio of a block. The replaced intra prediction modes are illustrated in Table 1.

TABLE 1

Intro prediction modes replaced by wide-angle modes

| Condition | Replaced intra prediction modes |
|---|---|
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == 1/2 | Modes 61, 62, 63, 64, 65, 66 |
| H/W < 1/2 | Mode 57, 58, 59, 60, 61, 62, 63, 64, 65, 66 |

Figure 4:
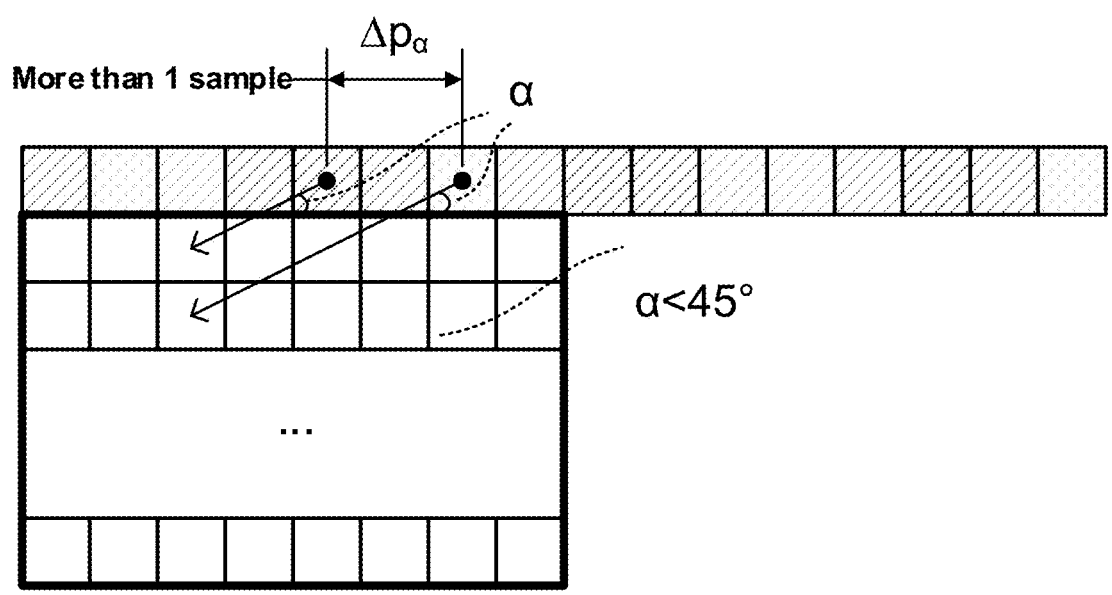
FIG. 4 shows an example of a discontinuity when using wide-angle intra prediction.
Figure 5A:
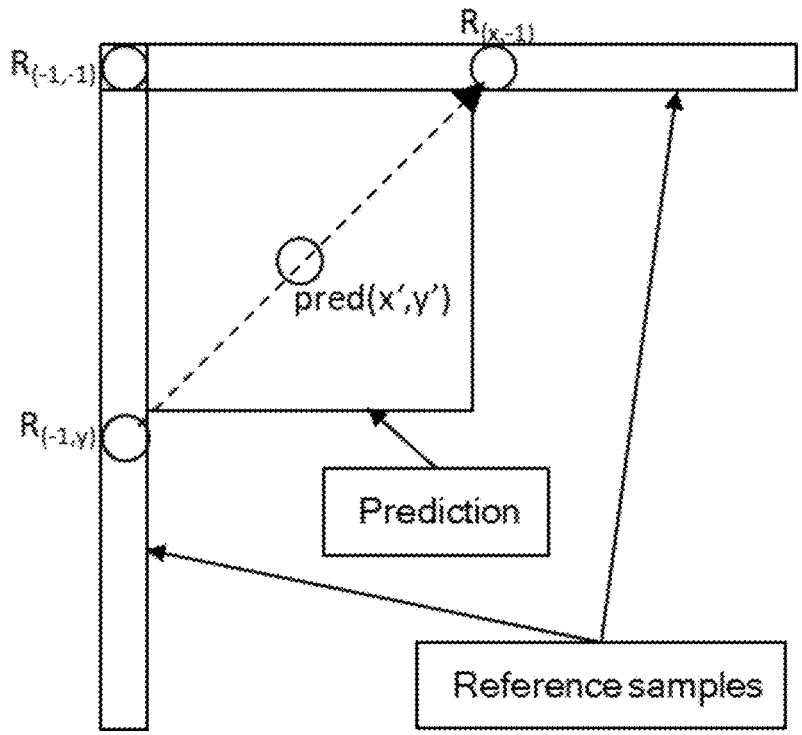
FIGS. 5A-5D show examples of samples used by a position-dependent intra prediction combination (PDPC) method.
Figure 5B:
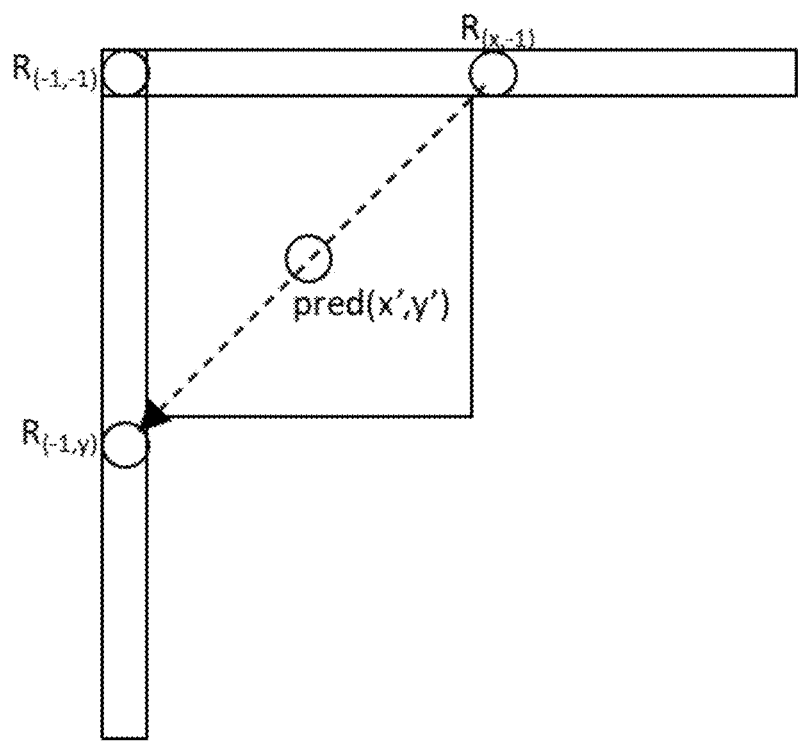
Figure 5C:
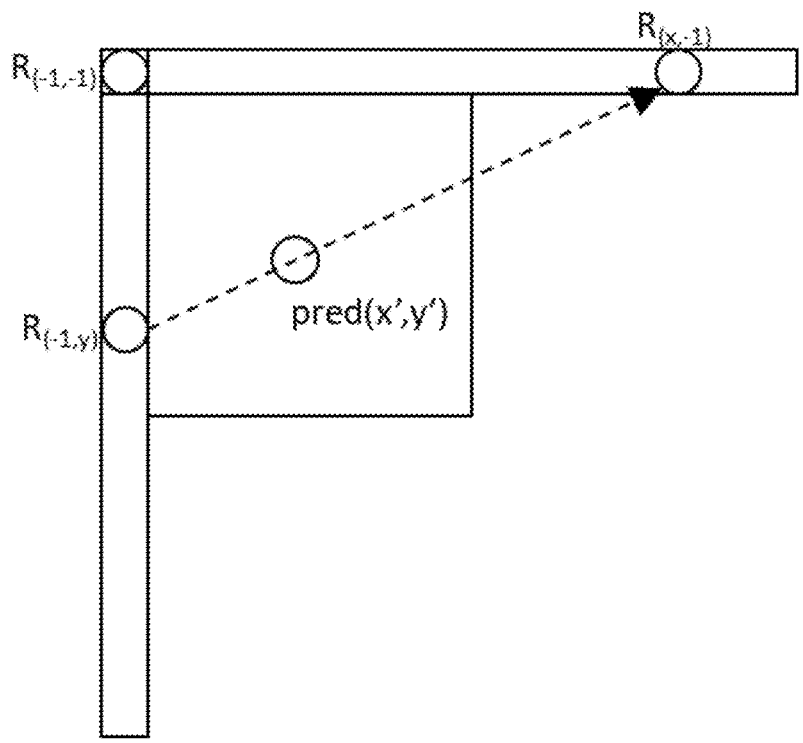
Figure 5D:
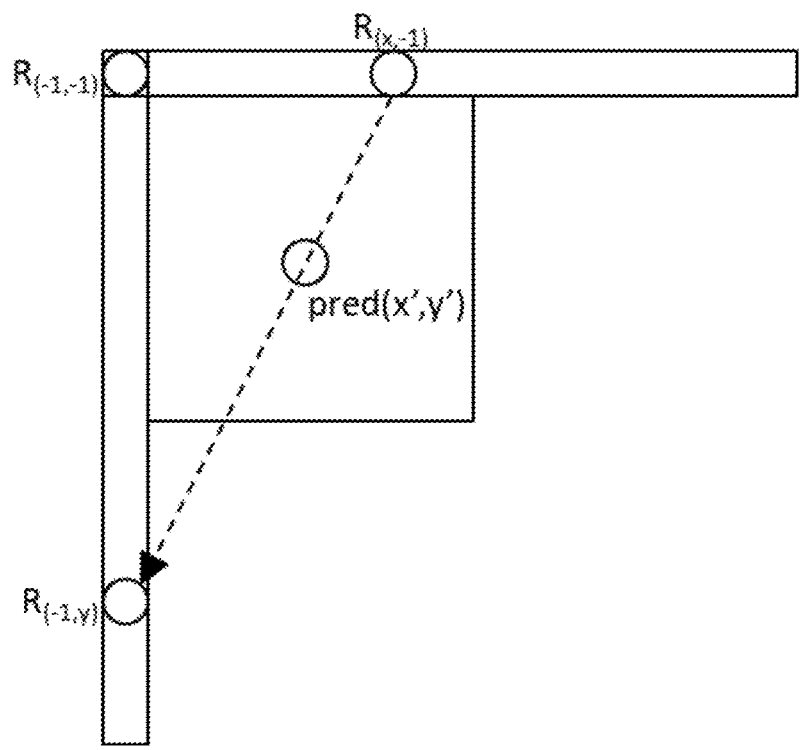

As shown in FIG. 4, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$.

2.5 Examples of Position Dependent Intra Prediction Combination (PDPC)

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the Equation as follows:

$$\text{pred}(x,y)=(wL\times R_{-1,y}+wT\times R_{x,-1}-wTL\times R_{-1,-1}+(64-wL-wT+wTL)\times\text{pred}(x,y)+32)>>\text{shift}$$

Herein, $R_{x,-1}$, $R_{-1,y}$ represent the reference samples located at the top and left of current sample (x,y), respectively, and $R_{-1,-1}$ represents the reference sample located at the top-left corner of the current block.

In some embodiments, and if PDPC is applied to DC, planar, horizontal, and vertical intra modes, additional boundary filters are not needed, as required in the case of HEVC DC mode boundary filter or horizontal/vertical mode edge filters.

FIGS. 5A-5D illustrate the definition of reference samples ($R_{x,-1}$, $R_{-1,y}$ and $R_{-1,-1}$) for PDPC applied over various prediction modes. The prediction sample pred (x',y') is located at (x',y') within the prediction block. The coordinate x of the reference sample $R_{x,-1}$ is given by: x=x'+y'+1, and the coordinate y of the reference sample $R_{-1,y}$ is similarly given by: y=x'+y'+1.

In some embodiments, the PDPC weights are dependent on prediction modes and are shown in Table 2, where S=shift.

TABLE 2

Examples of PDPC weights according to prediction modes

| Prediction modes | wT | wL | wTL |
|---|---|---|---|
| Diagonal top-right | 16 >> ((y' << 1) >> S) | 16 >> ((x' << 1) >> S) | 0 |
| Diagonal bottom-left | 16 >> ((y' << 1) >> S) | 16 >> ((x' << 1) >> S) | 0 |
| Adjacent diag. top-right | 32 >> ((y' << 1) >> S) | 0 | 0 |
| Adjacent diag. bottom-left | 0 | 32 >> ((x' << 1) >> S) | 0 |

2.6 Intra Subblock Partitioning

Figure 6:
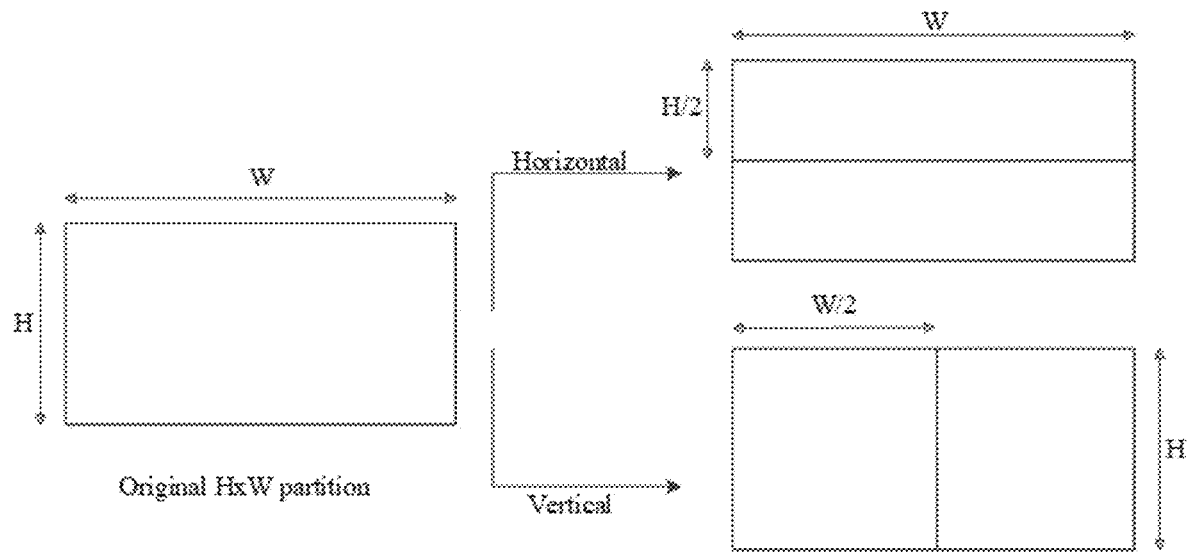
FIG. 6 shows an example of divisions of 4×8 and 8×4 blocks.
Figure 7:
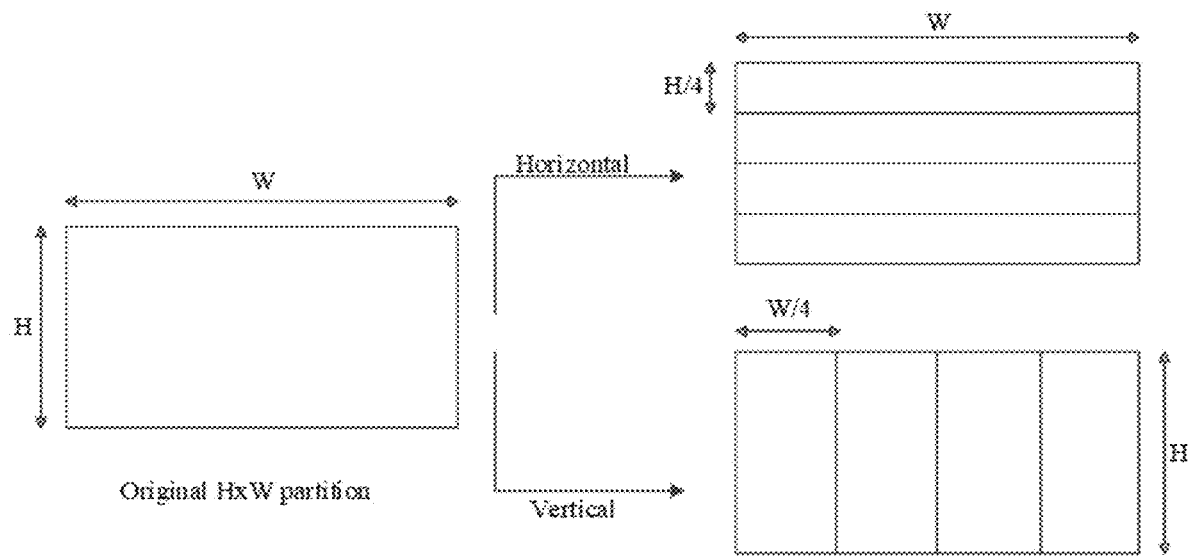
FIG. 7 shows an example of divisions all blocks except 4×8, 8×4 and 4χ4.

In JVET-M0102, ISP is proposed, which divides luma intra-predicted blocks vertically or horizontally into 2 or 4 sub-partitions depending on the block size dimensions, as shown in Table 3. FIG. 6 and FIG. 7 show examples of the two possibilities. All sub-partitions fulfill the condition of having at least 16 samples.

TABLE 3

Number of sub-partitions depending on the block size

| Block Size | Number of Sub-Partitions |
|---|---|
| 4x4 | Not divided |
| 4x8 and 8x4 | 2 |
| All other cases | 4 |

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Based on the intra mode and the split utilized, two different classes of processing orders are used, which are referred to as normal and reversed order. In the normal order, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

2.7 Block Differential Pulse-Code Modulation Coding (BDPCM)

BDPCM is proposed in NET-M0057. Due to the shape of the horizontal (resp. vertical) predictors, which use the left (A) (resp. top (B)) pixel for prediction of the current pixel, the most throughput-efficient way of processing the block is to process all the pixels of one column (resp. line) in parallel, and to process these columns (resp. lines) sequentially. In order to increase throughput, we introduce the following process: a block of width 4 is divided into two halves with a horizontal frontier when the predictor chosen on this block is vertical, and a block of height 4 is divided into two halves with a vertical frontier when the predictor chosen on this block is horizontal.

Figure 8:
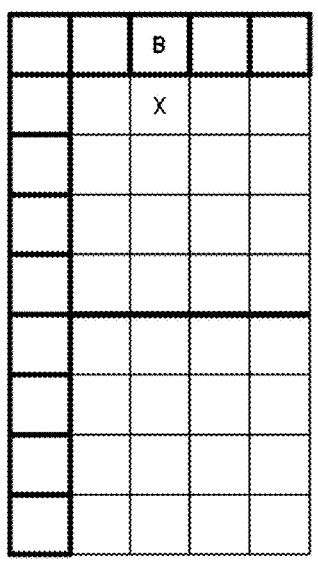
FIG. 8 shows an example of dividing a block of 4×8 samples into two independently decodable areas.
Figure 8:
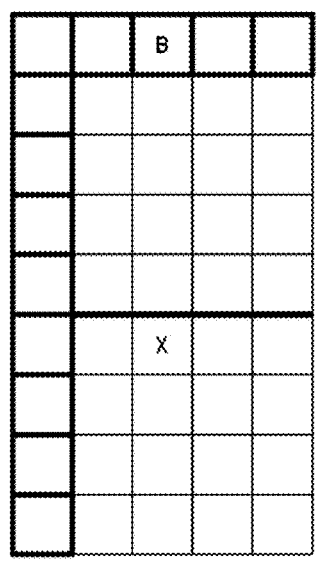
Figure 8:
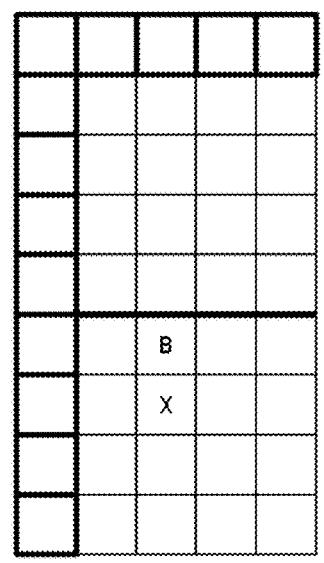

When a block is divided, samples from one area are not allowed to use pixels from another area to compute the prediction: if this situation occurs, the prediction pixel is replaced by the reference pixel in the prediction direction. This is shown on FIG. 8 for different positions of current pixel X in a 4x8 block predicted vertically.

Figure 9:
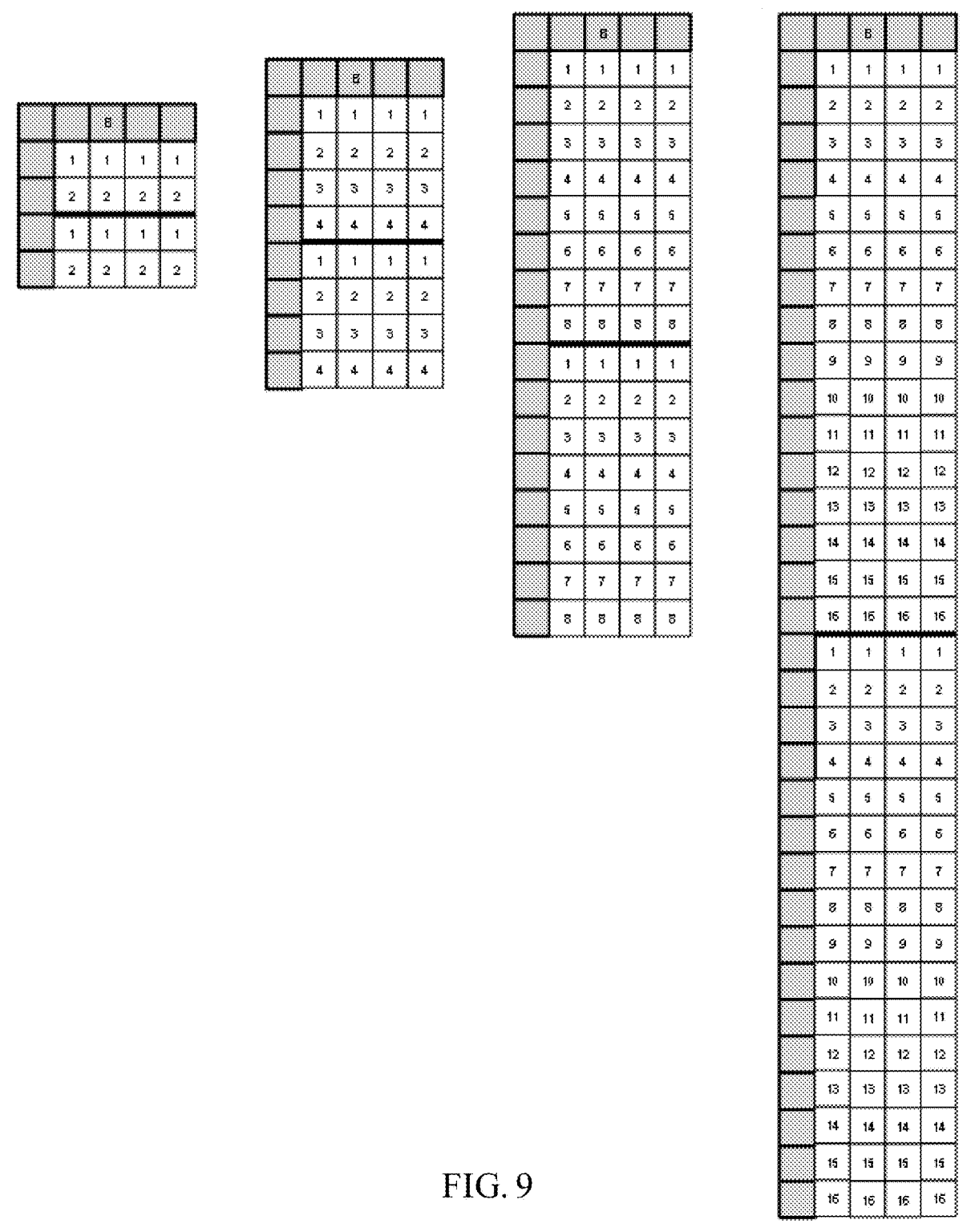

Because of this property, it becomes now possible to process a 4x4 block in 2 cycles, and a 4x8 or 8x4 block in 4 cycles, and so on, as shown on FIG. 9.

Table 4 summarizes the number of cycles required to process the block, depending on the block size. It is trivial to show that any block which has both dimensions larger or equal to 8 can be processed in 8 pixels per cycle or more.

TABLE 4

| | Throughput for blocks of size 4xN, Nx4 | | | |
|---|---|---|---|---|
| Block size | 4x4 | 4x8, 8x4 | 4x16, 16x4 | 4x32, 32x4 |
| Cycles | 2 | 4 | 8 | 16 |
| Pixels | 16 | 32 | 64 | 128 |
| Throughput (pixels/cycle) | 8 | 8 | 8 | 8 |

2.8 Quantized Residual Domain BDPCM

In JVET-N0413, quantized residual domain BDPCM (denote as RBDPCM hereinafter) is proposed. The intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (rows)×N (cols), let $r_{i,j}$, $0 \leq i \leq M-1$, $0 \leq j \leq N-1$. be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signaled:

$$\tilde{r}_{i,j} = \begin{cases} Q(r_{i,j}), & i = 0, \quad 0 \leq j \leq (N-1) \\ Q(r_{i,j}) - Q(r_{(i-1),j}), & 1 \leq i \leq (M-1), \ 0 \leq j \leq (N-1) \end{cases}$$

For horizontal prediction, similar rules apply, and the residual quantized samples are obtained by $$\tilde{r}_{i,j} = \begin{cases} Q(r_{i,j}), & 0 \leq i \leq (M-1), \ j = 0 \\ Q(r_{i,j}) - Q(r_{i,(j-1)}), & 0 \leq i \leq (M-1), \ 1 \leq j \leq (N-1) \end{cases}$$

The residual quantized samples $\tilde{r}_{i,j}$ are sent to the decoder.

On the decoder side, the above calculations are reversed to produce $Q(r_{i,j})$, $0 \leq i \leq M-1$, $0 \leq j \leq N-1$. For vertical prediction case, $Q(r_{i,j}) = \Sigma_{k=0}^{i} \tilde{r}_{k,j}, 0 \leq i \leq (M-1), 0 \leq j \leq (N-1)$ For horizontal case, $Q(r_{i,j}) = \Sigma_{k=0}^{j} \tilde{r}_{i,k}, 0 \leq i \leq (M-1), 0 \leq j \leq (N-1)$ The invert quantized residuals, $Q^{-1}(Q(r_{i,j}))$, are added to the intra block prediction values to produce the reconstructed sample values.

One of the benefits of this scheme is that inverting the DPCM can be done on the fly during coefficient parsing simply adding the predictor as the coefficients are parsed or it can be performed after parsing.

Transform skip is always used in quantized residual domain BDPCM.

2.9 Multiple Transform Set (MTS) in VVC

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. The Table 4 below shows the basis functions of the selected DST/DCT.

TABLE 4

Basis functions of transform matrices used in VVC

| Transform Type | Basis function $T_i(j)$, $i, j = 0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ <br> where $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32

CBF flag is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 5. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

| MTS_CU_flag | MTS_Hor_flag | MTS_Ver_flag | Intra/inter Horizontal | Vertical |
|---|---|---|---|---|
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signalled when the CU level MTS_CU_flag is not equal to zero. The block size limitation for transform skip is the same to that for MTS in JEM4, which indicate that transform skip is applicable for a CU when both block width and height are equal to or less than 32.

Implicit MTS is a recent tool in VVC. The variable implicitMtsEnabled is derived as follows:
If sps_mts_enabled_flag is equal to 1 and one of the following conditions is true, implicitMtsEnabled is set equal to 1:
  IntraSubPartitionsSplitType is not equal to ISP_NO_SPLIT
  cu_sbt_flag is equal to 1 and Max(nTbW, nTbH) is less than or equal to 32
  sps_explicit_mts_intra_enabled_flag is equal to 0 and CuPredMode[0][xTbY][yTbY] is equal to MODE_INTRA and lfnst_idx[x0][y0] is equal to 0 and intra_mip_flag[x0][y0] is equal to 0
Otherwise, implicitMtsEnabled is set equal to 0.

In VVC Draft v6, if the current coding block is luma component and implicitMtsEnabled is equal to 1, the implicit MTS transform selection is decided by the following formula:

trTypeHor=(nTbW>=4&& nTbW<=16)?*DST7*:*DCT2*        (8-965)

trTypeVer=(nTbH>=4&& nTbH<=16)?*DST7*:*DCT2*        (8-966)

where trTypeHor and trTypeVer specify the horizontal and vertical transform kernels, and nTbW and nTbH specify the width and height of the transform block. The two formulas indicate that the implicit MTS transform is selected from the following pairs: {DST7, DST7}, {DST7, DCT2}, {DCT2, DST7}, {DCT2, DCT2}

2.10 Reduced Secondary Transform (RST) Proposed in JVET-N0193

2.10.1 Non-Separable Secondary Transform (NSST) in JEM

Figure 10:
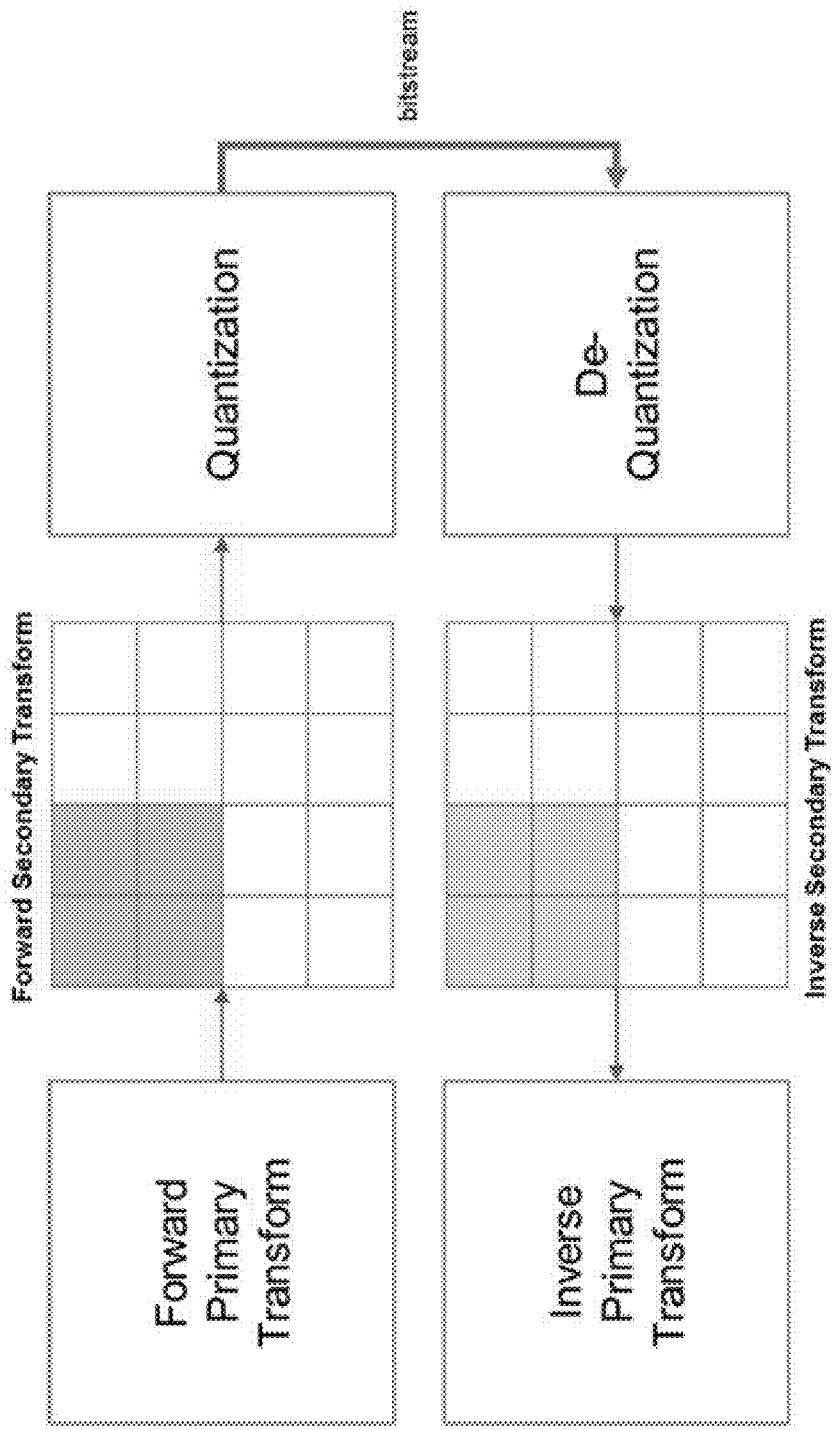
FIG. 10 shows an example of a secondary transform in JEM.

In JEM, secondary transform is applied between forward primary transform and quantization (at encoder) and between de-quantization and invert primary transform (at decoder side). As shown in FIG. 10, 4×4 (or 8×8) secondary transform is performed depends on block size. For example, 4×4 secondary transform is applied for small blocks (i.e., min (width, height) <8) and 8×8 secondary transform is applied for larger blocks (i.e., min (width, height)>4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$\vec{X}=[X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T$ The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform (NSST) candidate is further specified by the explicitly signalled secondary transform index. The index is signalled in a bit-stream once per Intra CU after transform coefficients.

2.10.2 Reduced Secondary Transform (RST) in JVET-N0193

Figure 11:
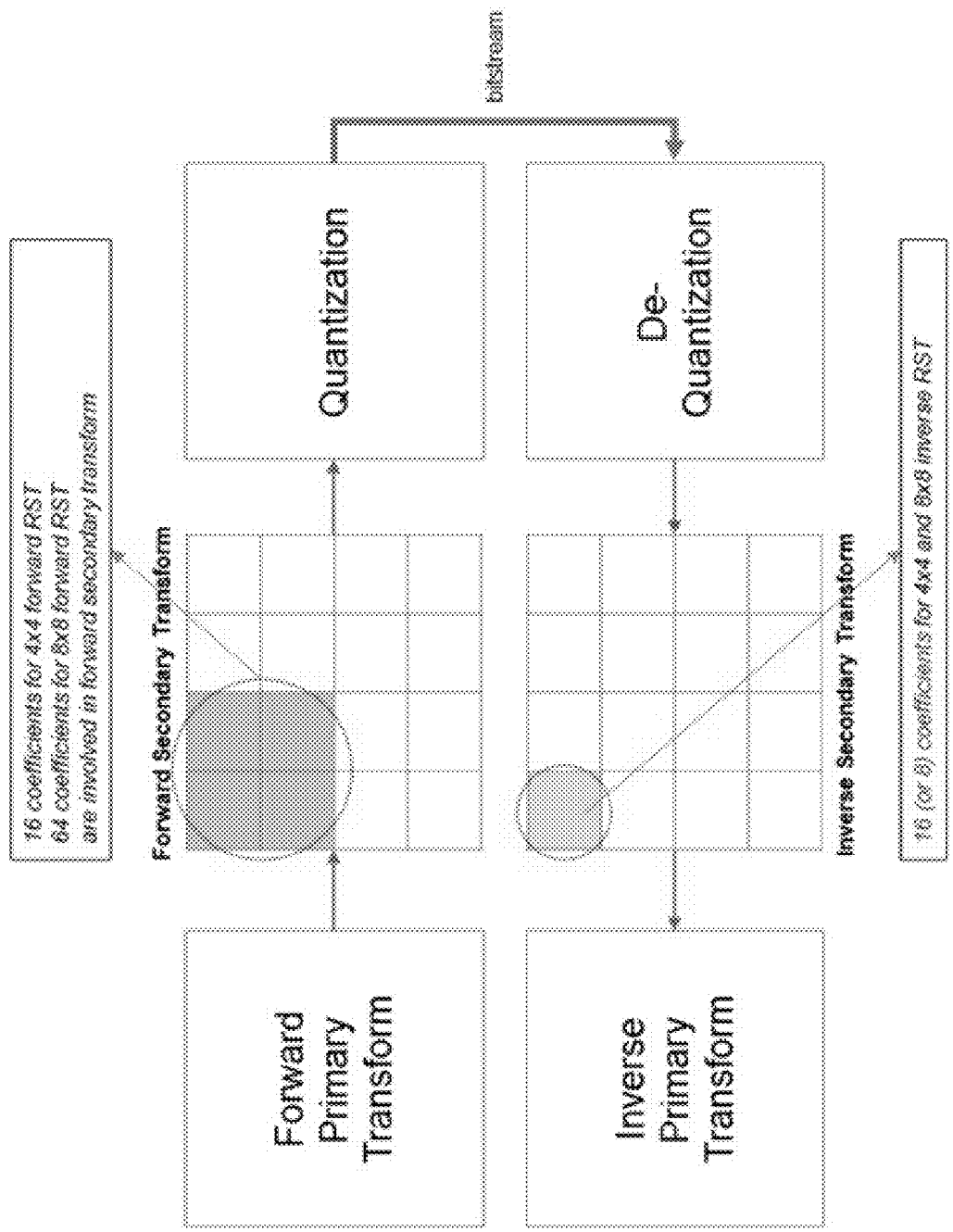
FIG. 11 shows an example of the proposed reduced secondary transform (RST).

The RST (a.k.a. Low Frequency Non-Separable Transform (LFNST)) was introduced in JVET-K0099 and 4 transform set (instead of 35 transform sets) mapping introduced in JVET-L0133. In this JVET-N0193, 16×64 (further reduced to 16×48) and 16×16 matrices are employed. For notational convenience, the 16×64 (reduced to 16×48) transform is denoted as RST8×8 and the 16×16 one as RST4×4. FIG. 11 shows an example of RST.

RST Computation

The main idea of a Reduced Transform (RT) is to map an N dimensional vector to an R dimensional vector in a different space, where R/N (R<N) is the reduction factor.

Figure 12:
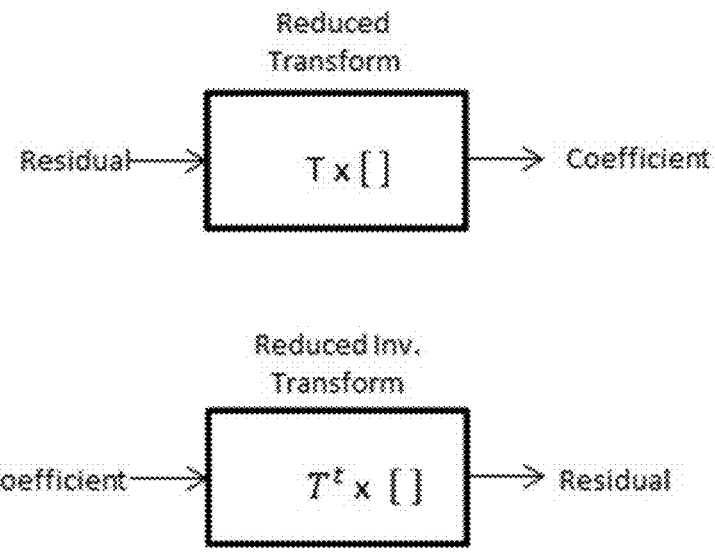
FIG. 12 shows examples of the forward and inverse reduced transforms.

The RT matrix is an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The invert transform matrix for RT is the transpose of its forward transform. The forward and invert RT are depicted in FIG. 12.

In this contribution, the RST8×8 with a reduction factor of 4 (¼ size) is applied. Hence, instead of 64×64, which is conventional 8×8 non-separable transform matrix size, 16×64 direct matrix is used. In other words, the 64×16 invert RST matrix is used at the decoder side to generate core (primary) transform coefficients in 8×8 top-left regions. The forward RST8×8 uses 16×64 (or 8×64 for 8×8 block) matrices so that it produces non-zero coefficients only in the top-left 4×4 region within the given 8×8 region. In other words, if RST is applied then the 8×8 region except the top-left 4×4 region will have only zero coefficients. For RST4×4, 16×16 (or 8×16 for 4×4 block) direct matrix multiplication is applied.

An invert RST is conditionally applied when the following two conditions are satisfied:

Block size is greater than or equal to the given threshold (W>=4 && H>=4)

Transform skip mode flag is equal to zero

If both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

If RST index is equal to 0, RST is not applied. Otherwise, RST is applied, of which kernel is chosen with the RST index. The RST selection method and coding of the RST index are explained later.

Furthermore, RST is applied for intra CU in both intra and inter slices, and for both Luma and Chroma. If a dual tree is enabled, RST indices for Luma and Chroma are signaled separately. For inter slice (the dual tree is disabled), a single RST index is signaled and used for both Luma and Chroma.

In 13$^{th}$ JVET meeting, Intra Sub-Partitions (ISP), as a new intra prediction mode, was adopted. When ISP mode is selected, RST is disabled and RST index is not signaled, because performance improvement was marginal even if RST is applied to every feasible partition block. Furthermore, disabling RST for ISP-predicted residual could reduce encoding complexity.

RST Selection

A RST matrix is chosen from four transform sets, each of which consists of two transforms. Which transform set is applied is determined from intra prediction mode as the following:

(1) If one of three CCLM modes is indicated, transform set 0 is selected.
(2) Otherwise, transform set selection is performed according to the following table:

| The transform set selection table | |
|---|---|
| IntraPredMode | Tr. set index |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index to access the above table, denoted as IntraPredMode, have a range of [−14, 83], which is a transformed mode index used for wide angle intra prediction.

RST Matrices of Reduced Dimension

Figure 13:
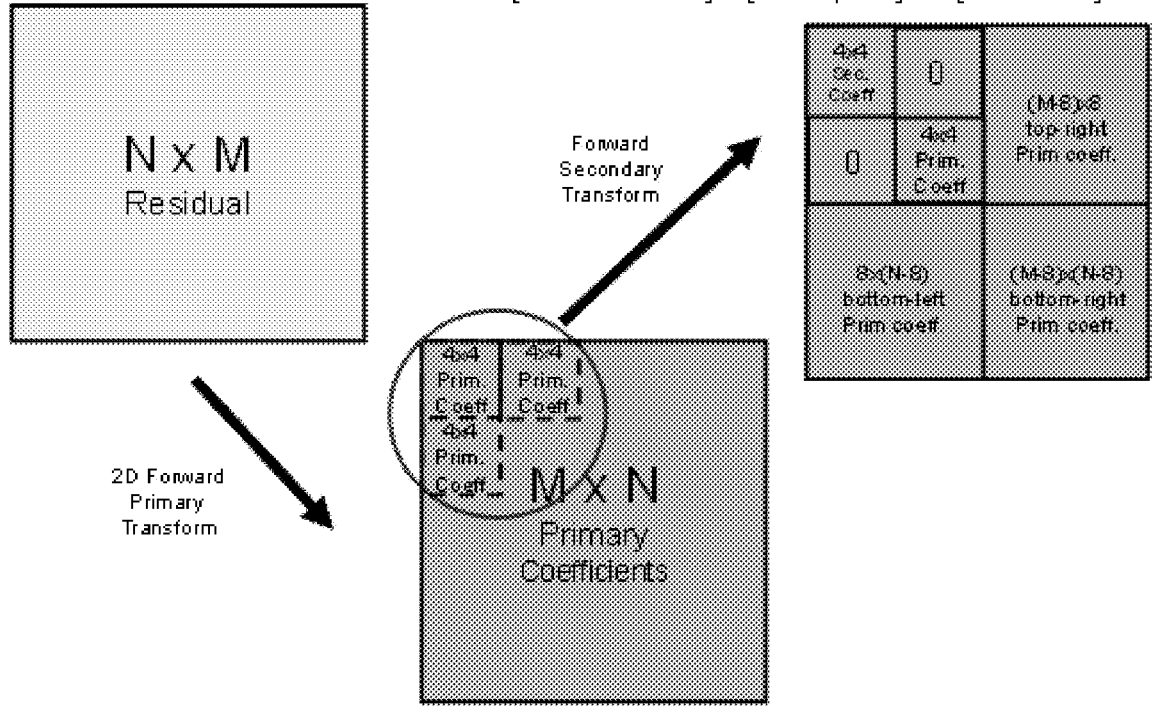
FIG. 13 shows an example of a forward RST 8×8 process with a 16×48 matrix.

As a further simplification, 16×48 matrices are applied instead of 16×64 with the same transform set configuration, each of which takes 48 input data from three 4×4 blocks in a top-left 8×8 block excluding right-bottom 4×4 block (as shown in FIG. 13).

RST Signaling

Figure 14:
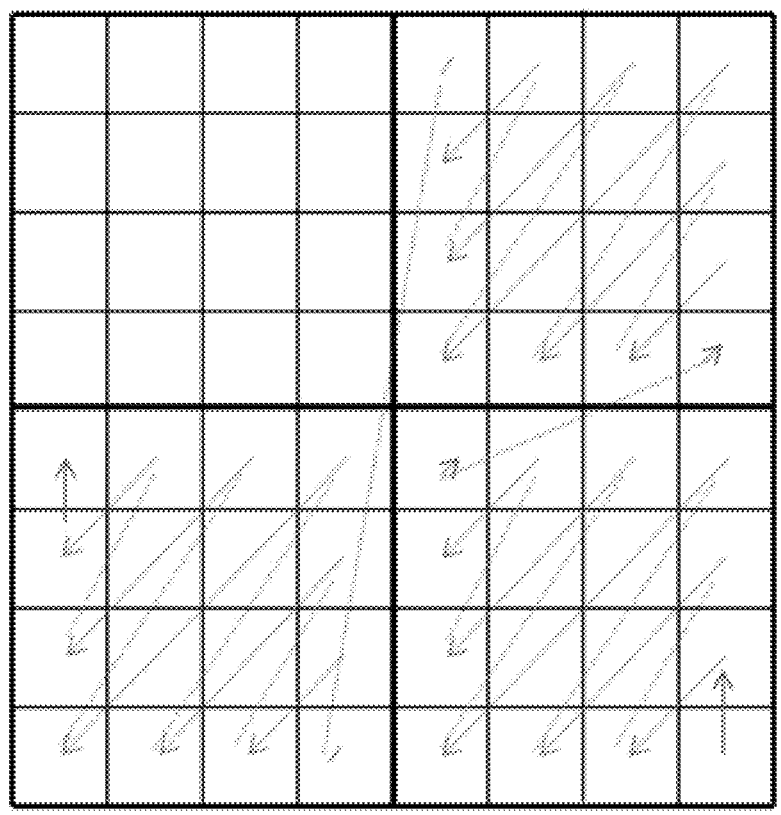
FIG. 14 shows an example of scanning positions 17 through 64 in an 8×8 block for a non-zero element.

The forward RST8×8 with R=16 uses 16×64 matrices so that it produces non-zero coefficients only in the top-left 4×4 region within the given 8×8 region. In other words, if RST is applied then the 8×8 region except the top-left 4×4 region generates only zero coefficients. As a result, RST index is not coded when any non-zero element is detected within 8×8 block region other than top-left 4×4 (which is depicted in FIG. 14) because it implies that RST was not applied. In such a case, RST index is inferred to be zero.

Zero-Out Range

Usually, before applying the invert RST on a 4×4 sub-block, any coefficient in the 4×4 sub-block may be non-zero. However, it is constrained that in some cases, some coefficients in the 4×4 sub-block must be zero before invert RST is applied on the sub-block.

Let nonZeroSize be a variable. It is required that any coefficient with the index no smaller than nonZeroSize when it is rearranged into a 1-D array before the invert RST must be zero.

When nonZeroSize is equal to 16, there is no zero-out constrain on the coefficients in the top-left 4×4 sub-block.

In JVET-N0193, when the current block size is 4×4 or 8×8, nonZeroSize is set equal to 8 (that is, coefficients with the scanning index in the range [8, 15] as show in FIG. 14, shall be 0). For other block dimensions, nonZeroSize is set equal to 16.

Description of RST in Working Draft

Sequence Parameter Set RBSP Syntax

| seq_parameter_set_rbsp( ) { | Descriptor |
|---|---|
| ...... | |
| sps_mts_enabled_flag | u(1) |
| if( sps_mts_enabled_flag ) { | |
|    sps_explicit_mts_intra_enabled_flag | u(1) |
|    sps_explicit_mts_inter_enabled_flag | u(1) |
| } | |
| ...... | |
| sps_st_enabled_flag | u(1) |
| ...... | |
| } | |

Residual Coding Syntax

| residual_coding( x0, y0, log2TbWidth, log2TbHeight, cIdx ) { | Descriptor |
|---|---|
| ... | |
|   if( coded_sub_block_flag[ xS ][ yS ] && ( n > 0 \|\| !inferSbDcSigCoeffFlag ) && | |
|     ( xC != LastSignificantCoeffX \|\| yC != Last SignificantCoeffY ) ) { | |
|     sig_coeff_flag[ xC ][ yC ] | ae(v) |
|     remBinsPass1−− | |
|     if( sig_coeff_flag[ xC ][ yC ] ) | |
|       inferSbDcSigCoeffFlag = 0 | |
|   } | |
|   if( sig_coeff_flag[ xC ][ yC ] ) { | |
|     if( !transform_skip_flag[ x0 ][ y0 ] ) { | |
|       numSigCoeff++ | |
|       if( ( ( ( log2TbWidth == 2 && log2TbHeight == 2 ) \|\| ( log2TbWidth == 3 && | |
| log2TbHeight == 3 ) ) && n >= 8 && i == 0 ) \|\| ( ( log2TbWidth >= 3 && log2TbHeight >= 3 | |
| &&( i == 1 \|\| i == 2 ) ) ) ) { | |
|         numZeroOutSigCoeff++ | |

-continued

| residual_coding( x0, y0, log2TbWidth, log2TbHeight, cIdx ) { | Descriptor |
|---|---|
|     } | |
|   } | |
|   abs_level_gt1_flag[ n ] | ae(v) |
| ... | |

Coding Unit Syntax

| coding_unit( x0, y0, cbWidth, cbHeight, treeType ) { | Descriptor |
|---|---|
| ... | |
|   if( !pcm_flag[ x0 ][ y0 ] ) { | |
|     if( CuPredMode[ x0 ][ y0 ] != MODE_INTRA && merge_flag[ x0 ][ y0 ] = = 0 ) | |
|       cu_cbf | ae(v) |
|     if( cu_cbf ) { | |
|       if( CuPredMode[ x0 ][ y0 ] = = MODE_INTER && sps_sbt_enabled_flag && | |
|         !ciip_flag[ x0 ][ y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >= 16 | |
|           allowSbtHorH = cbHeight >= 8 | |
|           allowSbtHorQ = cbHeight >= 16 | |
|           if( allowSbtVerH \|\| allowSbtHorH \|\| allowSbtVerQ \|\| allowSbtHorQ ) | |
|             cu_sbt_flag | ae(v) |
|         } | |
|         if( cu_sbt_flag ) { | |
|           if( ( allowSbtVerH \|\| allowSbtHorH ) && ( allowSbtVerQ \|\| allowSbtHorQ) ) | |
|             cu_sbt_quad_flag | ae(v) |
|           if( ( cu_sbt_quad_flag && allowSbtVerQ && allowSbtHorQ ) \|\| | |
|             ( !cu_sbt_quad_flag && allowSbtVerH && allowSbtHorH ) ) | |
|             cu_sbt_horizontal_flag | ae(v) |
|           cu_sbt_pos_flag | ae(v) |
|         } | |
|       } | |
|       numZeroOutSigCoeff = 0 | |
|       transform_tree( x0, y0, cbWidth, cbHeight, treeType ) | |
|       if( Min( cbWidth, cbHeight ) >= 4 && sps_st_enabled_flag == 1 && CuPredMode[ x0 ][ y0 ] = = MODE_INTRA && IntraSubPartitionsSplitType == ISP_NO_SPLIT ) { | |
|         if( ( numSigCoeff > ( ( treeType == SINGLE_TREE ) ? 2 : 1 ) ) && numZeroOutSigCoeff == 0 ) { | |
|           st_idx[ x0 ][ y0 ] | ae(v) |
|         } | |
|       } | |
|     } | |
|   } | |
| } | |

Sequence Parameter Set RBSP Semantics

. . .

sps_st_enabled_flag equal to 1 specifies that st_idx may be present in the residual coding syntax for intra coding units. sps_st_enabled_flag equal to 0 specifies that st_idx is not present in the residual coding syntax for intra coding units.

. . .

Coding Unit Semantics

. . .

st_idx[x0][y0] specifies which secondary transform kernel is applied between two candidate kernels in a selected transform set. st_idx[x0][y0] equal to 0 specifies that the secondary transform is not applied. The array indices x0, y0 specify the location (x0, y0) of the top-left sample of the considered transform block relative to the top-left sample of the picture. When st_idx[x0][y0] is not present, st_idx[x0][y0] is inferred to be equal to 0.

Transformation Process for Scaled Transform Coefficients

General

Inputs to this process are:

a luma location (xTbY, yTbY) specifying the top-left sample of the current luma transform block relative to the top-left luma sample of the current picture, a variable nTbW specifying the width of the current transform block, a variable nTbH specifying the height of the current transform block, a variable cIdx specifying the colour component of the current block, an (nTbW)x(nTbH) array d[x][y] of scaled transform coefficients with x=0 . . . nTbW−1, y=0 . . . nTbH−1.

Output of this process is the (nTbW)x(nTbH) array r[x][y] of residual samples with x=0 . . . nTbW−1, y=0 . . . nTbH−1.

If st_idx[xTbY][yTbY] is not equal to 0, the following applies:

1. The variables nStSize, log 2StSize, numStX, numStY, and nonZeroSize are derived as follows:
    If both nTbW and nTbH are greater than or equal to 8, log 2StSize is set to 3 and nStOutSize is set to 48.
    Otherwise, log 2StSize is set to 2 and nStOutSize is set to 16.
    nStSize is set to (1<<log 2StSize).
    If nTbH is equal to 4 and nTbW is greater than 8, numStX set equal to 2.
    Otherwise, numStX set equal to 1.
    If nTbW is equal to 4 and nTbH is greater than 8, numStY set equal to 2.
    Otherwise, numStY set equal to 1.
    If both nTbW and nTbH are equal to 4 or both nTbW and nTbH are equal to 8, nonZeroSize is set equal to 8.
    Otherwise, nonZeroSize set equal to 16.
2. For xSbIdx=0 . . . numStX−1 and ySbIdx=0 . . . numStY−1, the following applies:
    The variable array u[x] with x=0 . . . nonZeroSize=1 are derived as follows:

$xC=(xSbIdx<<\log 2StSize)+DiagScanOrder[\log 2StSize][\log 2StSize][x][0]$ $yC=(ySbIdx<<\log 2StSize)+DiagScanOrder[\log 2StSize][\log 2StSize][x][1]$ $u[x]=d[xC][yC]$ u[x] with x=0 . . . nonZeroSize−1 is transformed to the variable array v[x] with x=0 . . . nStOutSize−1 by invoking the one-dimensional transformation process as specified in clause 8.7.4.4 with the transform input length of the scaled transform coefficients nonZeroSize, the transform output length nStOutSize the list u[x] with x=0 . . . nonZeroSize−1, the index for transform set selection stPredModeIntra, and the index for transform selection in a transform set st_idx[xTbY][yTbY] as inputs, and the output is the list v[x]c with x=0 . . . nStOutSize−1. The variable stPredModeIntra is set to the predModeIntra specified in clause 8.4.4.2.1.
    The array d[(xSbIdx<<log 2StSize)+x][(ySbIdx<<log 2StSize)+y] with x=0 . . . nStSize−1, y=0 . . . nStSize=1 are derived as follows:
        If stPredModeIntra is less than or equal to 34, or equal to INTRA_LT_CCLM, INTRA_T_CCLM, or INTRA_L_CCLM, the following applies:

$d[(xSbIdx<<\log 2StSize)+x][(ySbIdx<<\log 2StSize)+y]=(y<4)?v[x+(y<<\log 2StSize)]:((x<4)?v[32+x+((y-4)<<2)]: d[(xSbIdx<<\log 2StSize)+x][(ySbIdx<<\log 2StSize)+y]$ Otherwise, the following applies:

$d[(xSbIdx<<\log 2StSize)+x][(ySbIdx<<\log 2StSize)+y]=(y<4)?v[y+(x<<\log 2StSize)]:((x<4)?v[32+(y-4)+(x<<2)]: d[(xSbIdx<<\log 2StSize)+x][(ySbIdx<<\log 2StSize)+y])$ Secondary Transformation Process
Inputs to this Process are:
    a variable nTrS specifying the transform output length,
    a variable nonZeroSize specifying the transform input length,
    a list of transform input x[j] with j=0 . . . nonZeroSize−1,
    a variable stPredModeIntra specifying the index for transform set selection,
    a variable stIdx specifying the index for transform selection in a set.

Output of this process is the list of transformed samples y[i] with i=0 . . . nTrS−1.
The transformation matrix derivation process as specified in clause 8.7.4.5 is involved with the transform output length nTrS, the index for transform set selection stPredModeIntra, and the index for transform selection in a transform set stIdx as inputs, and the transformation matrix secTransMatrix as output.
The list of transformed samples y[i] with i=0 . . . nTrS=1 is derived as follows:

$y[i]=\text{Clip3}(\text{CoeffMin},\text{CoeffMax},((\Sigma_{j=0}^{nonzerosize-1}\text{sec-TransMatrix}[j][i]*x[j])+64)>>7)$ with i=0 . . . nTrS−1
CoeffMin=−(1<<15) and CoeffMax=(1<<15)−1;
Secondary Transformation Matrix Derivation Process
Inputs to this process are:
    a variable nTrS specifying the transform output length,
    a variable stPredModeIntra specifying the index for transform set selection,
    a variable stIdx specifying the index for transform selection in the designated transform set.
Output of this process is the transformation matrix secTransMatrix.
The variable stTrSetIdx is derived as follows:

| stPredModeIntra | stTrSetIdx |
| --- | --- |
| stPredModeIntra < 0 | 1 |
| 0 <= stPredModeIntra <= 1 | 0 |
| 2 <= stPredModeIntra <= 12 | 1 |
| 13 <= stPredModeIntra <= 23 | 2 |
| 24 <= stPredModeIntra <= 44 | 3 |
| 45 <= stPredModeIntra <= 55 | 2 |
| 56 <= stPredModeIntra | 1 |

The transformation matrix secTransMatrix is derived based on nTrS, stTrSetIdx, and stIdx as follows:
    If nTrS is equal to 16, stTrSetIdx is equal to 0, and stIdx is equal to 1, the following applies: secTransMatrix [m][n]= . . . .
    If nTrS is equal to 16, stTrSetIdx is equal to 0, and stIdx is equal to 2, the following applies: secTransMatrix [m][n]= . . . .
    If nTrS is equal to 16, stTrSetIdx is equal to 1, and stIdx is equal to 1, the following applies: secTransMatrix [m][n]= . . . .
    If nTrS is equal to 16, stTrSetIdx is equal to 1, and stIdx is equal to 2, the following applies: secTransMatrix [m][n]= . . . .
    If nTrS is equal to 16, stTrSetIdx is equal to 2, and stIdx is equal to 1, the following applies: secTransMatrix [m][n]= . . . .
    If nTrS is equal to 16, stTrSetIdx is equal to 2, and stIdx is equal to 2, the following applies: secTransMatrix [m][n]= . . . .
    If nTrS is equal to 16, stTrSetIdx is equal to 3, and stIdx is equal to 1, the following applies: secTransMatrix [m][n]= . . . .
    If nTrS is equal to 16, stTrSetIdx is equal to 3, and stIdx is equal to 2, the following applies: secTransMatrix [m][n]= . . . .
    If nTrS is equal to 48, stTrSetIdx is equal to 0, and stIdx is equal to 1 the following applies: secTransMatrix [m][n]= . . . .
    If nTrS is equal to 48, stTrSetIdx is equal to 0, and stIdx is equal to 2 the following applies: secTransMatrix [m][n]= . . . .
    If nTrS is equal to 48, stTrSetIdx is equal to 1, and stIdx is equal to 1 the following applies: secTransMatrix [m][n]= . . . .

If nTrS is equal to 48, stTrSetIdx is equal to 1, and stIdx is equal to 2 the following applies: secTransMatrix [m][n]= . . . .

If nTrS is equal to 48, stTrSetIdx is equal to 2, and stIdx is equal to 1 the following applies: secTransMatrix [m][n]= . . . .

If nTrS is equal to 48, stTrSetIdx is equal to 2, and stIdx is equal to 2 the following applies: secTransMatrix [m][n]= . . . .

If nTrS is equal to 48, stTrSetIdx is equal to 3, and stIdx is equal to 1 the following applies: secTransMatrix [m][n]= . . . .

If nTrS is equal to 48, stTrSetIdx is equal to 3, and stIdx is equal to 2 the following applies: secTransMatrix [m][n]= . . . .

2.11 Clipping of Dequantization in HEVC

In HEVC, the scaled transform coefficient d' is calculated as $$d'=\text{Clip3}(\text{coeffMin},\text{coeffMax},d),$$

where d is the scaled transform coefficient before clipping.

For luma component, coeffMin=CoeffMinY,coeffMax=CoeffMaxY;

For chroma components, coeffMin=CoeffMinC,coeffMax=CoeffMaxC.

Herein,

CoeffMinY=−(1<<(extended precision processing flag?Max(15,BitDepthY+6): 15))

CoeffMinC=−(1<<(extended precision processing flag?Max(15,BitDepthC+6):15))

CoeffMaxY=(1<<(extended precision processing flag?Max(15,BitDepthY+6):15))−1

CoeffMaxC=(1<<(extended precision processing flag?Max(15,BitDepthC+6):15))−1 extended precision processing flag is a syntax element signaled in SPS.

2.12 Affine Linear Weighted Intra Prediction (ALWIP, or Matrix Based Intra Prediction)

Affine linear weighted intra prediction (ALWIP, or matrix based intra prediction (MIP)) is proposed in JVET-N0217.

In JVET-N0217, two tests are conducted. In test 1, ALWIP is designed with a memory restriction of 8K bytes and at most 4 multiplications per sample. Test 2 is similar to test 1, but further simplifies the design in terms of memory requirement and model architecture.

Single set of matrices and offset vectors for all block shapes.

Reduction of number of modes to 19 for all block shapes.

Reduction of memory requirement to 5760 10-bit values, that is 7.20 Kilobyte.

Linear interpolation of predicted samples is carried out in a single step per direction replacing iterative interpolation as in the first test.

2.13 Sub-Block Transform

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode.

In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 15. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

3 Examples of Drawbacks in Existing Implementations

The current design of MTS has the following problems:

The signaled index may cause overhead bits.

Some combinations of transforms may not be efficient in MTS and SBT.

4 Exemplary Methods for Multiple Transforms

Embodiments of the presently disclosed technology overcome drawbacks of existing implementations, thereby providing video coding with higher coding efficiencies but lower computational complexity. Methods for multiple transforms, and as described in the present document, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

In the following examples, it is assumed that:

Max(x,y) returns the larger one of x and y, and

Min(x,y) returns the smaller one of x and y.

Implicit MTS

It is proposed to decide the transform (horizontal and/or vertical transform) applied to one block according to decoded coefficients without receiving transform indices.

1. The decoded coefficients may be associated with one or multiple representative blocks in the same color component as the current block or different color component.

a. In one example, the determination on the transform of a first block may depend on the decoded coefficients of the first block.

b. In one example, the determination on the transform of a first block may depend on the decoded coefficients of a second block which may be different to the first block.

i. In one example, the second block may be in the same color component, such as the luma component, as the color component of the first block.

1) In one example, the second block may be neighbouring to the first block.

2) In one example, the second block may be with the same intra prediction mode as the first block.

3) In one example, the second block may be with the same block dimensions as the first block.

4) In one example, the second block may be the last decoded block satisfying certain conditions, such as the same intra-prediction mode or the same dimensions, before the first block in the decoding order.
    ii. In one example, the second block may be in a different color component from that of the first block.
      1) In one example, the first block may be in the luma component, and the second block may be in a chroma component (e.g., the Cb/Cr, B/R component).
        a) In one example, the three blocks are in the same coding unit.
        b) Alternatively, furthermore, implicit MTS is applied only to the luma blocks, not to chroma blocks.
      2) In one example, the first block in the first color component and the second block in the second color component may be at the corresponding locations of a picture with each other.
  c. In one example, the determination on the transform of a first block may depend on the decoded coefficients of multiple blocks comprising at least one block not identical to the first block.
    i. In one example, multiple blocks may comprise the first block.
    ii. In one example, multiple blocks may comprise one block or plurality of neighbouring to the first block.
    iii. In one example, multiple blocks may comprise one block or plurality of blocks with the same block dimensions as the first block.
    iv. In one example, multiple blocks may comprise last N decoded block satisfying certain conditions, such as the same intra-prediction mode or the same dimensions, before the first block in the decoding order. N is an integer larger than 1.
    v. In one example, multiple blocks may comprise one block or plurality of blocks not in the same color component as the first block.
      1) In one example, the first block may be in the luma component. Multiple blocks may comprise blocks in chroma components (e.g., a second block in the Cb/B component, and a third block in the Cr/R component).
        a) In one example, the three blocks are in the same coding unit.
        b) Alternatively, furthermore, implicit MTS is applied only to the luma blocks, not to chroma blocks.
      2) In one example, the first block in the first color component and the plurality of blocks not in the first component color component comprised in the multiple blocks may be at the corresponding locations of a picture with the first block.
2. The decoded coefficients utilized for transform determination are those unequal to zero (denoted as significant coefficients). Those coefficients utilized for transform determination are called representative coefficients.
  a. In one example, representative coefficients are all the significant coefficients in representative blocks.
  b. Alternatively, representative coefficients are partial of significant coefficients in representative blocks.
    i. In one example, representative coefficients are those decoded significant coefficients which are larger than or no smaller than a threshold
    ii. In one example, representative coefficients are those decoded significant coefficients which are smaller than or no greater than a threshold
    iii. In one example, representative coefficients are the first K (K>=1) decoded significant coefficients in the decoding order.
    iv. In one example, representative coefficients are the last K (K>=1) decoded significant coefficients in the decoding order.
    v. In one example, representative coefficients may be those at a predefined location in a block.
      1) In one example, representative coefficients may comprise only one coefficient located at (xPos, yPos) coordinate relative to the representative block. E.g. xPos=yPos=0.
      2) For example, the positions may depend on the dimensions of the block.
    vi. In one example, representative coefficients may be those at a predefined position in the coefficient scanning order.
  c. Alternatively, representative coefficients may also comprise those zero coefficients.
  d. Alternatively, representative coefficients may be those derived from decoded coefficients, such as via clipping to a range, via quantization.
3. The transform determination may depend on a function of representative coefficients, such as a function with a value V as the output, using representative coefficients as inputs.
  a. In one example, V is derived as the number of representative coefficients.
    i. Alternatively, V is derived as the sum of representative coefficients.
      1) Alternatively, furthermore, the sum may be clipped to derive V.
    ii. Alternatively, V is derived as the sum of absolute values of representative coefficients.
      1) Alternatively, furthermore, the sum may be clipped to derive V.
  b. In one example, the selection may be determined implicitly at the decoder depending on the parity of V.
    i. For example, if V is even, a first kind of transform is selected as the horizontal transform and a second kind of transform is selected as the vertical transform; and if V is odd, a third kind of transform is selected as the horizontal transform and a forth kind of transform is selected as the vertical transform.
      1) In one example, the first kind of transform is the same to the second kind of transform.
        a) Alternatively, the first kind of transform is different to the second kind of transform.
      2) In one example, the third kind of transform is the same to the forth kind of transform.
        a) Alternatively, the third kind of transform is different to the forth kind of transform.
      3) The first/second/third/forth kind of transform is a specific transform such as DCT-X or DST-Y. X may be an integer such as 2 or 8. Y may be an integer such as 7 or 8.
      4) Alternatively, furthermore, at least one of the third and fourth kinds of transforms is different from the first and second kinds of transform.

a) In one example, when V is even, the first and second kinds of transforms are DCT-2 and when V is odd, the third and fourth kinds of transforms are DST-7.
b) Alternatively, when V is odd, the first and second kinds of transforms are DCT-2 and when V is even, the third and fourth kinds of transforms are DST-7.
c. In one example, if V is smaller than a threshold T1, a fifth kind of transform is selected as the horizontal transform and a sixth kind of transform is selected as the vertical transform. e.g. T1=1 or 2.
i. Alternatively, if V is larger than a threshold T2, a fifth kind of transform is selected as the horizontal transform and a sixth kind of transform is selected as the vertical transform.
ii. For example, the threshold may depend on the dimensions of the block.
iii. For example, the threshold may depend on the QP.
iv. In one example, the fifth kind of transform is the same to the sixth kind of transform.
1) Alternatively, the fifth kind of transform is different to the sixth kind of transform.
v. In one example, the fifth/sixth kind of transform is a specific transform such as DCT-X or DST-Y. X may be an integer such as 2 or 8. Y may be an integer such as 7 or 8.
4. The transform determination may further depend on the coded information of current block.
a. In one example, if current intra-coded block is in I-slice/picture, when V is even, DST-7 may be applied to current block and when V is odd, DCT-2 may be applied to current block.
b. In one example, if current intra-coded block is in P/B-slice/picture, and V is even, DCT-2 may be applied to current block and when V is odd, DST-7 may be applied to current block.
c. In one example, the determination may further depend on the mode information (e.g., intra or inter).
5. Transform sets which the implicit MTS may choose transforms from may be pre-defined.
a. In one example, the horizontal and vertical transform sets may be not identical.
i. Alternatively, the horizontal and vertical transform sets may be not identical.
b. In one example, the transform set may include DCT-2 and DST-7.
c. In one example, the transform set may include DCT-2, DST-7 and identify transform.
d. In one example, the transform set may be dependent on coded information, color component, partitioning structure (e.g., dual tree/single tree; quadtree/binary tree/ternary tree/extended quadtree), slice/picture types etc. al.
i. In one example, the transform set may be dependent on block dimension.
ii. In one example, for intra-coded blocks, DCT-2 and DST-7 may be included.
iii. In one example, for blocks coded with reference samples in the same picture (e.g., intra block copy), DST-7 and identity transform (i.e., without transform being applied) may be included.

6. In one example, one or multiple of the methods disclosed in bullet 1-bullet 5 can only be applied to specific blocks.
a. For example, one or multiple of the methods disclosed in bullet 1-bullet 5 can only be applied to intra-coded blocks.

Simplified MTS/SBT

Figure 15:
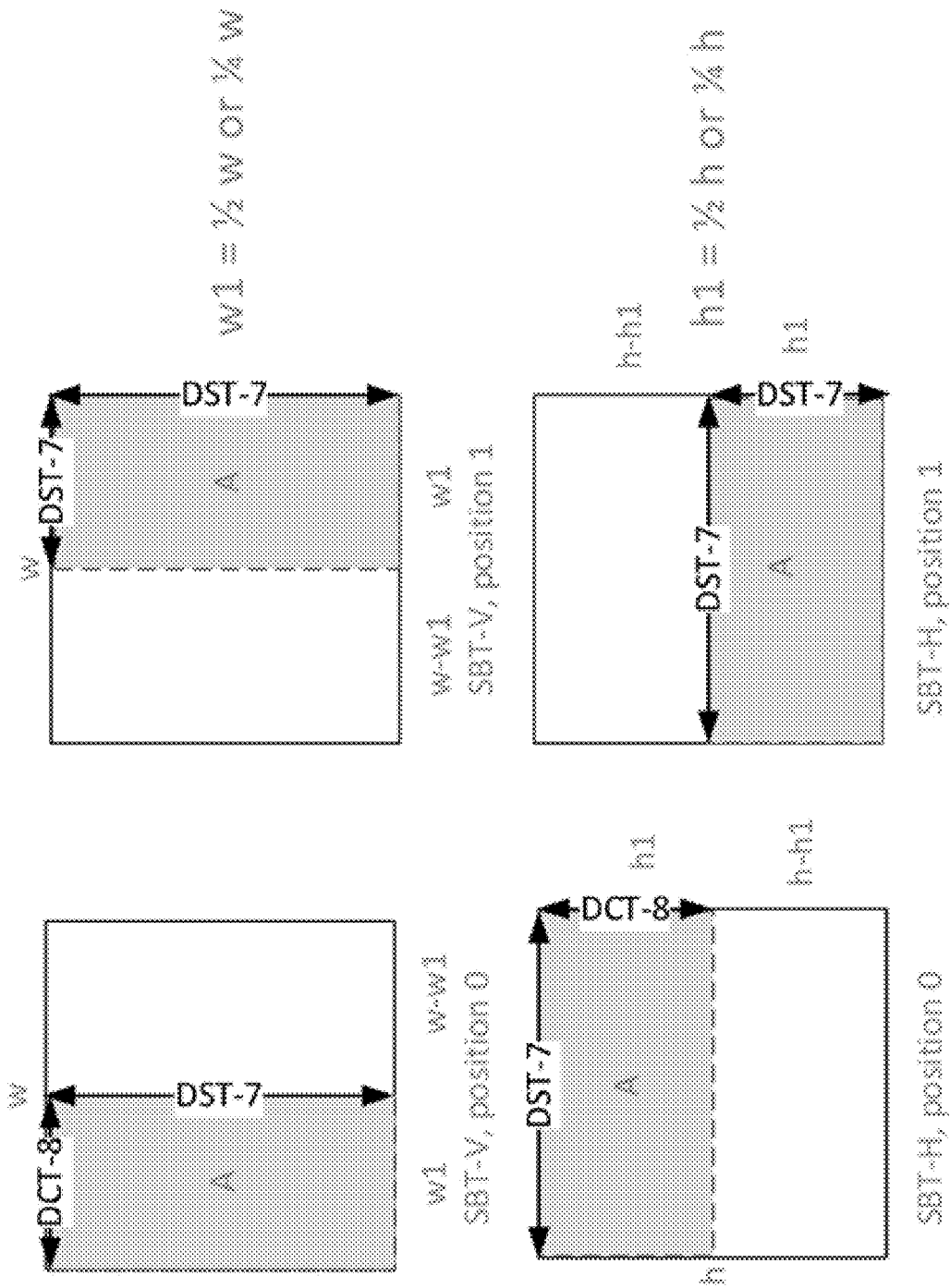
FIG. 15 shows an example of sub-block transform modes SBT-V and SBT-H.

7. In one example, the vertical transform and the horizontal transform must be the same in MTS.
a. In one example, a block can only choose one of the two kinds of transforms as below:
i. DCT-2 in horizontal transform and DCT-2 in vertical transform;
ii. DST-7 in horizontal transform and DST-7 in vertical transform;
b. In one example, the signaling for MTS may comprise at most one flag for a block.
i. In one example, if the flag is equal to 0, DCT-2 in horizontal transform and DCT-2 in vertical transform; if the flag is equal to 1, DST-7 in horizontal transform and DST-7 in vertical transform.
ii. In one example, if the flag is equal to 1, DCT-2 in horizontal transform and DCT-2 in vertical transform; if the flag is equal to 0, DST-7 in horizontal transform and DST-7 in vertical transform.
8. Suppose the block width and height are W and H, respectively. Bullet 7 may be applied only if
a. W>=T1 and H>=T2, e.g. T1=T2=8;
b. W<=T1 and H<=T2, e.g. T1=T2=16;
c. Min(W, H)>=T1, e.g. T1=8;
d. Max(W, H)<=T1, e.g. T1=32;
e. W*H>=T1, e.g. T1=64;
f. W*H<=T1, e.g. T1=256.
9. In one example, transforms excluding DST-8 can be applied in a block coded with SBT.
a. In one example, only DCT-2 and DST-7 can be applied in a block coded with SBT.
b. In one example, in the case of (SBT-V, position 0) for SBT as shown in FIG. 15, DCT-2 is applied horizontally and DST-7 is applied vertically.
c. In one example, in the case of (SBT-H, position 0) for SBT as shown in FIG. 15, DST-7 is applied horizontally and DCT-2 is applied vertically.
10. Suppose the transform block width and height are W and H, respectively. In one example, the selection of transforms for a block coded with SBT may depend on transform block dimensions, wherein the transform block may be smaller than the coding block when SBT is applied.
a. In one example, in the case of (SBT-V, position 0) for SBT as shown in FIG. 15, DCT-2 is applied horizontally and DST-7 is applied vertically if W>=T1; Otherwise, DCT-8 is applied horizontally and DST-7 is applied vertically. For example, T1=8.
b. In one example, in the case of (SBT-H, position 0) for SBT as shown in FIG. 15, DST-7 is applied horizontally and DCT-2 is applied vertically if H>=T1; Otherwise, DST-7 is applied horizontally and DCT-8 is applied vertically. For example, T1=8.

General Claims

11. The decision of transform matrix may be done in CU/CB-level or TU-level.
a. In one example, the decision is made in CU level wherein all TUs share the same transform matrix.
i. Alternatively, furthermore, when one CU is split to multiple TUs, coefficients in one TU (e.g., the first or the last TU) or partial or all TUs may be utilized to determine the transform matrix.
  b. Whether to use the CU-level solution or TU-level solution may depend on the block size and/or VPDU size and/or maximum CTU size and/or coded information of one block.
    i. In one example, when the block size is larger than the VPDU size, CU-level determination method may be applied.
12. In the disclosed methods in the document, the coefficients or representative coefficients may be quantized or dequantized.
13. Transform skip may also be determined by the coefficients or representative coefficients implicitly with any disclosed method in the document.
14. In the disclosed methods in the document, the coefficients or representative coefficients may be modified before being used to derive the transforms.
  a. For example, a coefficient or representative coefficients may be clipped before being used to derive the transforms.
  b. For example, a coefficient or representative coefficients may be scaled before being used to derive the transforms.
  c. For example, a coefficient or representative coefficients may be added by an offset before being used to derive the transforms.
  d. For example, coefficients or representative coefficients may be filtered before being used to derive the transforms.
  e. For example, a coefficient or representative coefficients may be mapped to other values (e.g., via look up tables) before being used to derive the transforms.
15. The disclosed methods in the document may also be used to derive other coding modes/information by the coefficients or representative coefficients implicitly.
  a. In one example, the disclosed methods may be used to derive the secondary transforms which may be applied to sub-region of a block.
  b. Alternatively, furthermore, the representative coefficients are from those corresponding to the sub-region instead of the whole block.
16. In one example, whether to and/or how to apply the disclosed methods above may be signaled at sequence level/picture level/slice level/tile group level, such as in sequence header/picture header/SPS/VPS/DPS/PPS/APS/slice header/tile group header.
17. In one example, whether to and/or how to apply the disclosed methods above may depend on coding information which may include:
  a. Block dimensions.
    i. In one example, for blocks with both width and height no greater than a threshold (e.g., 32), the above-mentioned implicit MTS method may be applied.
  b. QPs
  c. Picture or slice type (such as I-frame or P/B-frame, I-slice or P/B-slice)
    i. In one example, the proposed method may be enabled on I-frames but be disabled on P/B frames.
  d. Structure partitioning method (single tree or dual tree)
    i. In one example, for single tree partitioning applied slices/pictures/bricks/tiles, the above-mentioned implicit MTS method may be applied.
  e. Coding mode (such as inter mode/intra mode/IBC mode etc.)
    i. In one example, for intra-coded blocks, the above-mentioned implicit MTS method may be applied.
  f. Coding methods (such as Intra Sub-block partition, Derived Tree (DT) method, etc.)
    i. In one example, for intra-coded blocks with DT applied, the above-mentioned implicit MTS method may be disabled.
    ii. In one example, for intra-coded blocks with ISP applied, the above-mentioned implicit MTS method may be disabled.
  g. Color components
    i. In one example, for luma blocks, the above-mentioned implicit MTS method may be applied while for chroma blocks, it is not applied.
  h. Intra-prediction mode (such as DC, vertical, horizontal, etc.)
  i. Motion information (such as MV and reference index).
  j. Standard Profiles/Levels/Tiers The examples described above may be incorporated in the context of the methods described below, e.g., methods 1675, 1680 and 1685, which may be implemented at a video encoder and/or decoder.

Figures 16A, 16B:
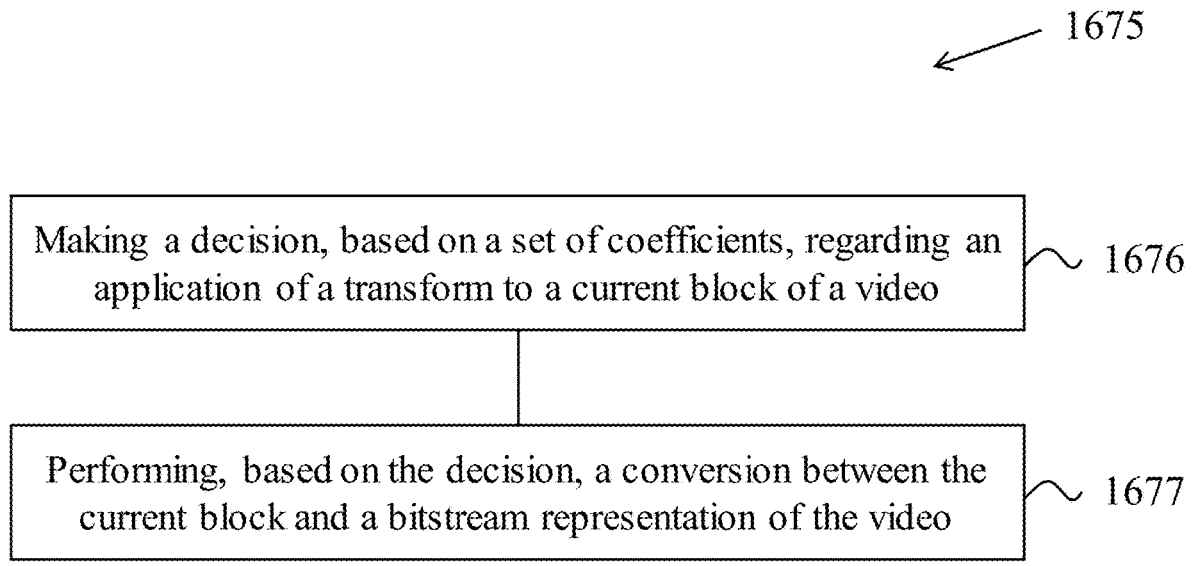
FIGS. 16A-16C show flowcharts of example methods for video processing.

FIG. 16A shows a flowchart of an exemplary method for video processing. The method 1675 includes, at step 1676, making a decision, based on a set of coefficients, regarding an application of a transform to a current block of a video.

The method 1675 includes, at step 1677, performing, based on the decision, a conversion between the current block and a bitstream representation of the video.

FIG. 16B shows a flowchart of an exemplary method for video processing. The method 1680 includes, at step 1681, making a decision, based on coding information associated with a current block of a video, regarding an application of a transform to the current block.

The method 1680 includes, at step 1682, performing, based on the decision, a conversion between the current block and a bitstream representation of the video.

Figure 16C:
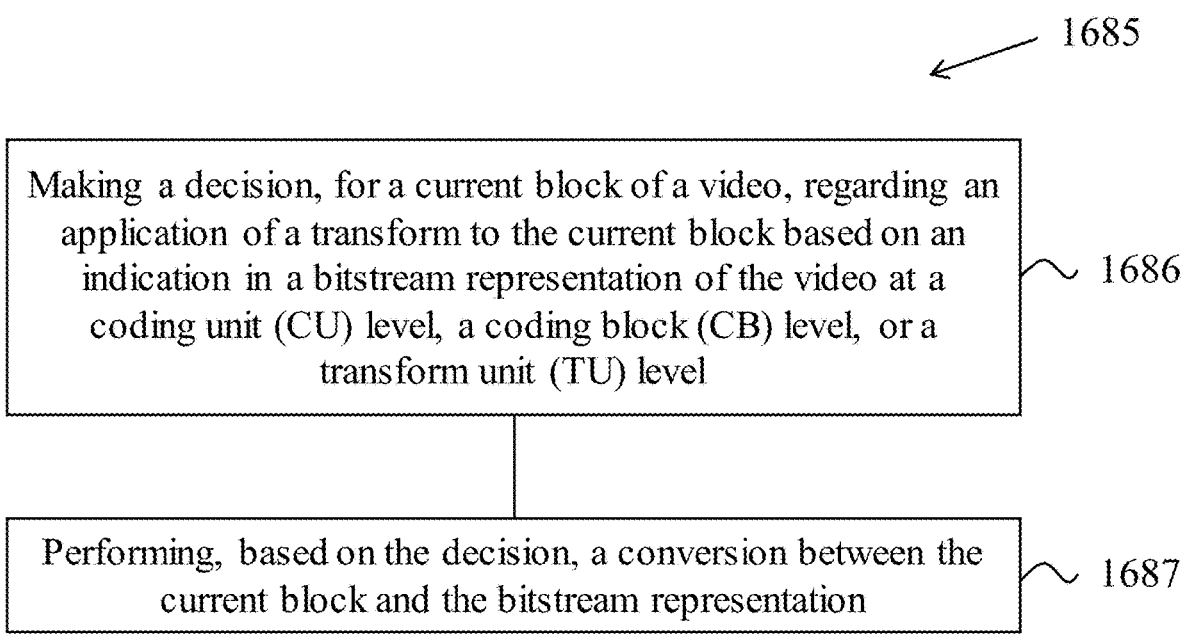

FIG. 16C shows a flowchart of an exemplary method for video processing. The method 1685 includes, at step 1686, making a decision, for a current block of a video, regarding an application of a transform to the current block based on an indication in a bitstream representation of the video at a coding unit (CU) level, a coding block (CB) level, or a transform unit (TU) level.

The method 1685 includes, at step 1687, performing, based on the decision, a conversion between the current block and the bitstream representation.

5 Example Implementations of the Disclosed Technology

In the following embodiments, additions are indicated using bolded double braces, e.g., {{a}} indicates that "a" has been added, whereas deletions are indicated using bolded double brackets, e.g., [[a]] indicates that "a" has been deleted.

5.1 Embodiment #1

The working draft specified in JVET-N1001-v7 may be changed as below.

8.7.4 Transformation Process for Scaled Transform Coefficients 8.7.4.1 General

TABLE 8-17

Specification of trTypeHor and trTypeVer depending on cu_sbt_horizontal_flag and cu_sbt_pos_flag

| cu_sbt_horizontal_flag | cu_sbt_pos_flag | trTypeHor | trTypeVer |
|---|---|---|---|
| 0 | 0 | {{nTbW >= 8? 0:}} 2 | 1 |
| 0 | 1 | 1 | 1 |
| 1 | 0 | 1 | {{nTbH >= 8? 0:}} 2 |
| 1 | 1 | 1 | 1 |

In some embodiments, the following technical solutions can be implemented:

C1. A method for video processing, comprising making a decision, based on a set of coefficients, regarding an application of a transform to a current block of a video; and performing, based on the decision, a conversion between the current block and a bitstream representation of the video.

C2. The method of solution C1, wherein the set of coefficients correspond to a set of quantized coefficients in the bitstream representation.

C3. The method of solution C1, wherein the set of coefficients correspond to a dequantized version of a set of quantized coefficients in the bitstream representation.

C4. The method of any of solutions C1 to C3, wherein an application of a transform skip to the current block is based on the set of coefficients.

C5. The method of any of solutions C1 to C3, further comprising modifying the set of coefficients; and deriving, prior to making the decision, the transform based on the modified set of coefficients.

C6. The method of solution C5, wherein modifying the set of coefficients comprises clipping at least one of the set of coefficients.

C7. The method of solution C5, wherein modifying the set of coefficients comprises scaling at least one of the set of coefficients.

C8. The method of solution C5, wherein modifying the set of coefficients comprises adding an offset to at least one of the set of coefficients.

C9. The method of solution C5, wherein modifying the set of coefficients comprises filtering at least one of the set of coefficients.

C10. The method of solution C5, wherein modifying the set of coefficient comprises mapping the set of coefficients, based on at least one look-up table (LUT), to the modified set of coefficients.

C11. The method of any of solutions C1 to C3, wherein deriving a coding mode and/or information associated with the current block is implicitly based on the set of coefficients.

C12. The method of any of solutions C1 to C3, wherein deriving a secondary transform applicable to a sub-region of the current block is based on the set of coefficients.

C13. The method of solution C12, wherein the set of coefficients correspond to the sub-region.

C14. The method of any of solutions C1 to C3, wherein making the decision is further based on an indication that is signaled in the bitstream representation at a sequence level, a picture level, a slice level, a tile group level.

C15. The method of any of solutions C1 to C3, wherein the indication is signaled in a sequence header, a picture header, a sequence parameter set (SPS), a video parameter set (VPS), a decoder parameter set (DPS), a picture parameter set (PPS), an adaptation parameter set (APS), a slice header, or a tile group header.

C16. The method of any of solutions C1 to C15, wherein the set of coefficients comprises a set of representative coefficients.

C17. A method for video processing, comprising making a decision, based on coding information associated with a current block of a video, regarding an application of a transform to the current block; and performing, based on the decision, a conversion between the current block and a bitstream representation of the video.

C18. The method of solution C17, wherein the transform is associated with an implicit selection of transforms (IST) mode, and wherein the IST mode comprises a selectively applying a transform type other than a Discrete Cosine Transform of Type II (DCT-II).

C19. The method of solution C17, wherein the coding information comprises a dimension of the current block.

C20. The method of solution C19, wherein the transform is applied when a height and a width of the current block is no greater than a threshold (T), and wherein T is a positive integer.

C21. The method of solution C20, wherein T=32.

C22. The method of solution C17, wherein the coding information comprises a quantization parameter (QP).

C23. The method of solution C17, wherein the coding information comprises a picture type of a current picture comprising the current block.

C24. The method of solution C23, wherein the picture type is an I-frame or a P/B-frame.

C25. The method of solution C24, wherein the transform is applied when the picture type is an I-frame, and wherein the transform is not applied when the picture type is a P/B-frame.

C26. The method of solution C17, wherein the coding information comprises a slice type of a current slice comprising the current block.

C27. The method of solution C26, wherein the slice type is an I-slice or a P/B-slice.

C28. The method of solution C17, wherein the coding information comprises a partitioning method of the current block.

C29. The method of solution C28, wherein the partitioning method is a single tree or a dual tree.

C30. The method of solution C17, wherein the coding information comprises a coding mode of the current block.

C31. The method of solution C30, wherein the coding mode comprises at least one of an inter mode, an intra mode, or an intra block copy (IBC) mode.

C32. The method of solution C30 or C31, wherein the transform is applied when the current block is an intra-coded block.

C33. The method of solution C17, wherein the coding information comprises a coding method applied to the current block.

C34. The method of solution C33, wherein the coding method is an intra sub-block partitioning (ISP) method and/or a derived tree (DT) method.

C35. The method of solution C33, wherein the transform is not applied when the current block is an intra-coded block with a derived tree (DT) method applied to the current block.

C36. The method of solution C33, wherein the transform is not applied when the current block is an intra-coded block with an intra sub-block partitioning (ISP) method applied to the current block.

C37. The method of solution C17, wherein the coding information comprises a color component of the video.

C38. The method of solution C37, wherein the transform is applied when the color component is a luma component of the video.

C39. The method of solution C37, wherein the transform is not applied when the color component is a chroma component of the video.

C40. The method of solution C17, wherein the coding information comprises an intra-prediction mode of the current block.

C41. The method of solution C17, wherein the coding information comprises motion information associated with the current block.

C42. The method of solution C41, wherein the motion information comprises one or more motion vectors and/or a reference index.

C43. The method of solution C17, wherein the coding information comprises a standard profile, level, or tier of the current block.

C44. A method for video processing, comprising making a decision, for a current block of a video, regarding an application of a transform to the current block based on an indication in a bitstream representation of the video at a coding unit (CU) level, a coding block (CB) level, or a transform unit (TU) level; and performing, based on the decision, a conversion between the current block and the bitstream representation.

C45. The method of solution C44, wherein making the decision is based on the indication at the CU level, and wherein all TUs share an identical transform matrix.

C46. The method of solution C44, wherein one CU is split into a plurality of TUs, and wherein a transform matrix corresponding to the transform is determined based on coefficients in one or more TUs of the plurality of TUs.

C47. The method of solution C46, wherein the one or more TUs comprise a first TU of the plurality of TUs.

C48. The method of solution C46, wherein the one or more TUs comprise a last TU of the plurality of TUs.

C49. The method of solution C46, wherein the one or more TUs exclude at least one TU of the plurality of TUs.

C50. The method of solution C46, wherein the one or more TUs comprise each of the plurality of TUs.

C51. The method of solution C44, whether making the decision is based on the indication at the CU level or the TU level is based on at least one of a size of the current block, a size of a virtual pipeline data unit (VPDU), a maximum size of a coding tree unit (CTU), and/or coded information of the current block.

C52. The method of solution C51, wherein the decision is based on the indication at the CU level when the size of the current block is larger than the size of the VPDU.

C53. The method of any of solutions C1 to C52, wherein the conversion generates the current block from the bitstream representation.

C54. The method of any of solutions C1 to C52, wherein the conversion generates the bitstream representation from the current block.

C55. An apparatus in a video system comprising a processor and a non-transitory memory with instructions thereon, wherein the instructions upon execution by the processor, cause the processor to implement the method in any one of solutions C1 to C54.

C56. A computer program product stored on a non-transitory computer readable media, the computer program product including program code for carrying out the method in any one of solutions C1 to C54.

Figure 17:
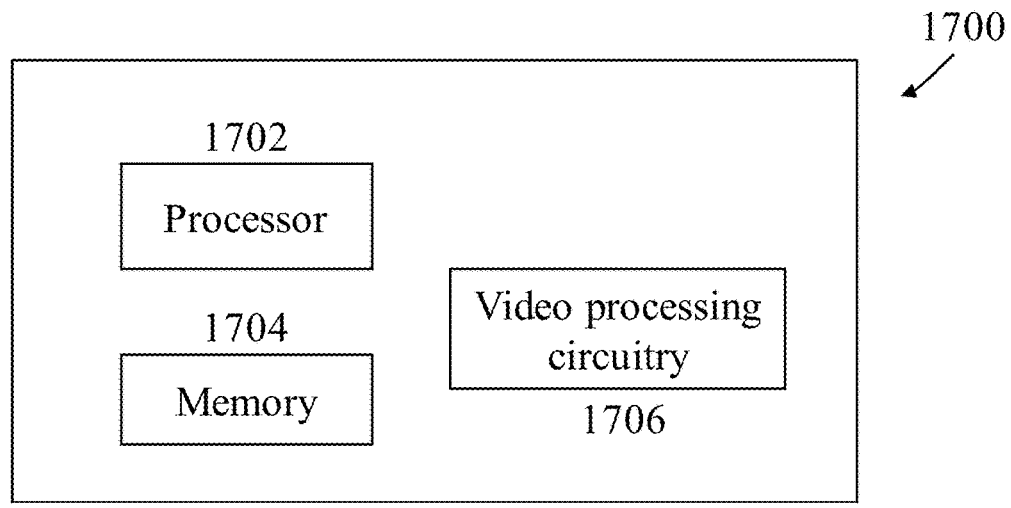
FIG. 17 is a block diagram of an example of a hardware platform for implementing a visual media decoding or a visual media encoding technique described in the present document.

FIG. 17 is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706. The processor(s) 1702 may be configured to implement one or more methods (including, but not limited to, methods 1675, 1680 and 1685) described in the present document. The memory (memories) 1704 may be used for storing data and code used for implementing the methods and techniques described herein. The video processing hardware 1706 may be used to implement, in hardware circuitry, some techniques described in the present document.

In some embodiments, the video coding methods may be implemented using an apparatus that is implemented on a hardware platform as described with respect to FIG. 17.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 18:
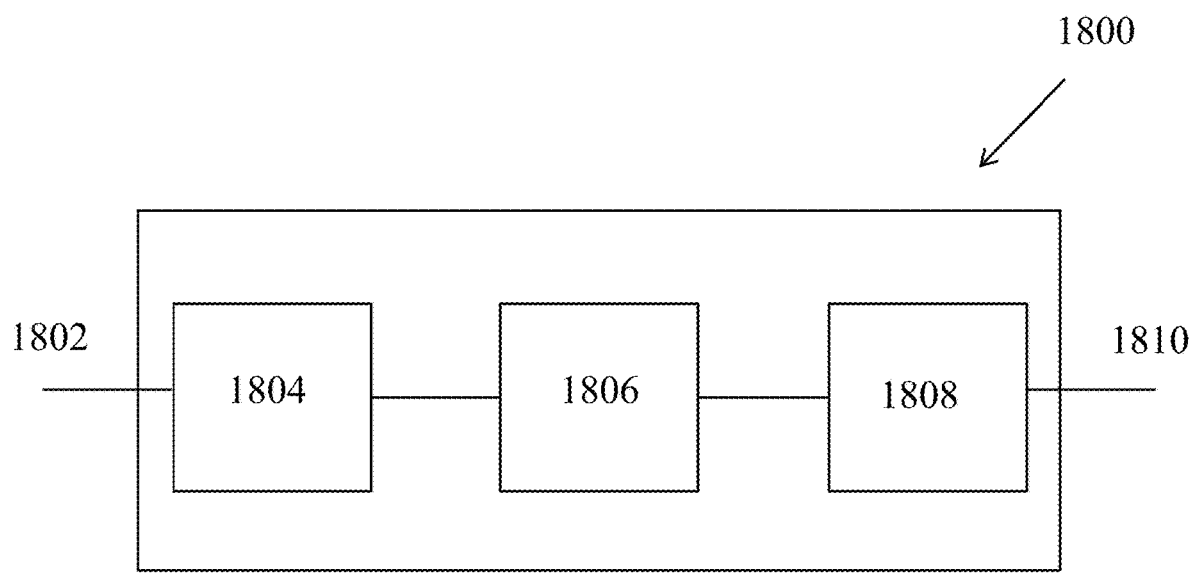
FIG. 18 is a block diagram of an example video processing system in which disclosed techniques may be implemented.

FIG. 18 is a block diagram showing an example video processing system 1800 in which various techniques disclosed herein may be implemented. Various implementations may include some or all of the components of the system 1800. The system 1800 may include input 1802 for receiving video content. The video content may be received in a raw or uncompressed format, e.g., 8 or 10 bit multi-component pixel values, or may be in a compressed or encoded format. The input 1802 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1800 may include a coding component 1804 that may implement the various coding or encoding methods described in the present document. The coding component 1804 may reduce the average bitrate of video from the input 1802 to the output of the coding component 1804 to produce a coded representation of the video. The coding techniques are therefore sometimes called video compression or video transcoding techniques. The output of the coding component 1804 may be either stored, or transmitted via a communication connected, as represented by the component 1806. The stored or communicated bitstream (or coded) representation of the video received at the input 1802 may be used by the component 1808 for generating pixel values or displayable video that is sent to a display interface 1810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
making a decision, based on coding information associated with a current block of a video, regarding an application of an implicit selected transform of a multiple transform selection process for a primary transform to the current block; and
performing, based on the decision, a conversion between the current block and a bitstream of the video,
wherein the implicit selected transform is not applied to the current block when the current block is an intra-coded block with a derived tree (DT),
wherein, in response to the implicit selected transform being applied to the current block, one or more transform matrices applied to the current block comprising at least one of a horizontal transform matrix or a vertical transform matrix are based on a set of representative coefficients of the current block.

2. The method of claim 1, wherein the implicit selected transform is applied under at least one condition including that the current block is an intra-coded block or an inter-coded block.

3. The method of claim 1, wherein the implicit selected transform is applied under at least one condition including that a height and a width of the current block is no greater than a threshold (T), and wherein T is a positive integer.

4. The method of claim 3, wherein T=32.

5. The method of claim 1, wherein the set of representative coefficients correspond to a dequantized version.

6. The method of claim 1, wherein the one or more transform matrices is determined at a transform unit (TU) level.

7. The method of claim 1, wherein the one or more transform matrices is based on a function of the set of representative coefficients, and an output of the function is a number of the set of representative coefficients.

8. The method of claim 7, wherein the horizontal transform matrix comprises a first transform matrix and the vertical transform matrix comprises a second transform matrix when the number is even, and wherein the horizontal transform matrix comprises a third transform matrix and the vertical transform matrix comprises a fourth transform matrix when the number is odd.

9. The method of claim 8, wherein the first transform matrix and the second transform matrix are a Discrete Sine Transform (DST) of Type VII (DST-VII), and the third transform matrix and the fourth transform matrix are a Discrete Cosine Transform (DCT) of Type II (DCT-II).

10. The method of claim 1, wherein the conversion includes encoding the current block into the bitstream.

11. The method of claim 1, wherein the conversion includes decoding the current block from the bitstream.

12. An apparatus for processing video data comprising a processor and a non-transitory memory with instructions thereon, wherein the instructions upon execution by the processor, cause the processor to:
make a decision, based on coding information associated with a current block of a video, regarding an application of an implicit selected transform of a multiple transform selection process for a primary transform to the current block; and
perform, based on the decision, a conversion between the current block and a bitstream of the video,
wherein the implicit selected transform is not applied to the current block when the current block is an intra-coded block with a derived tree (DT),
wherein, in response to the implicit selected transform being applied to the current block, one or more transform matrices applied to the current block comprising at least one of a horizontal transform matrix or a vertical transform matrix are based on a set of representative coefficients of the current block.

13. The apparatus of claim 12, wherein the implicit selected transform is applied under at least one condition including that a height and a width of the current block is no greater than a threshold (T), and wherein T is a positive integer, T=32.

14. The apparatus of claim 12,
wherein the set of representative coefficients correspond to a dequantized version and wherein the one or more transform matrices is determined at a transform unit (TU) level.

15. A non-transitory computer-readable storage medium storing instructions that cause a processor to:
make a decision, based on coding information associated with a current block of a video, regarding an application of an implicit selected transform of a multiple transform selection process for a primary transform to the current block; and
perform, based on the decision, a conversion between the current block and a bitstream of the video,
wherein the implicit selected transform is not applied to the current block when the current block is an intra-coded block with a derived tree (DT),
wherein, in response to the implicit selected transform being applied to the current block one or more transform matrices applied to the current block comprising at least one of a horizontal transform matrix or a vertical transform matrix are based on a set of representative coefficients of the current block.

16. The non-transitory computer-readable storage medium of claim 15, wherein the implicit selected transform is applied under at least one condition including that a height and a width of the current block is no greater than a threshold (T), and wherein T is a positive integer, T=32.

17. The non-transitory computer-readable storage medium of claim 15,
wherein the set of representative coefficients correspond to a dequantized version and wherein the one or more transform matrices is determined at a transform unit (TU) level.

18. A non-transitory computer-readable recording medium storing a bitstream of a video which is generated by a method performed by a video processing apparatus, wherein the method comprises:
making a decision, based on coding information associated with a current block of a video, regarding an application of an implicit selected transform of a multiple transform selection process for a primary transform to the current block; and generating the bitstream of the video based on the decision, wherein the implicit selected transform is not applied to the current block when the current block is an intra-coded block with a derived tree (DT), wherein, in response to the implicit selected transform being applied to the current block, one or more transform matrices applied to the current block comprising at least one of a horizontal transform matrix or a vertical transform matrix are based on a set of representative coefficients of the current block.

19. The non-transitory computer-readable recording medium of claim 18, wherein the implicit selected transform is applied under at least one condition including that a height and a width of the current block is no greater than a threshold (T), and wherein T is a positive integer, T=32, wherein the set of representative coefficients correspond to a dequantized version and wherein the one or more transform matrices is determined at a transform unit (TU) level.

* * * * *